Aug. 5, 1952 W. F. O'HALLORAN 2,605,879
AUTOMATIC TYPEWRITER
Filed Sept. 26, 1947 10 Sheets-Sheet 3

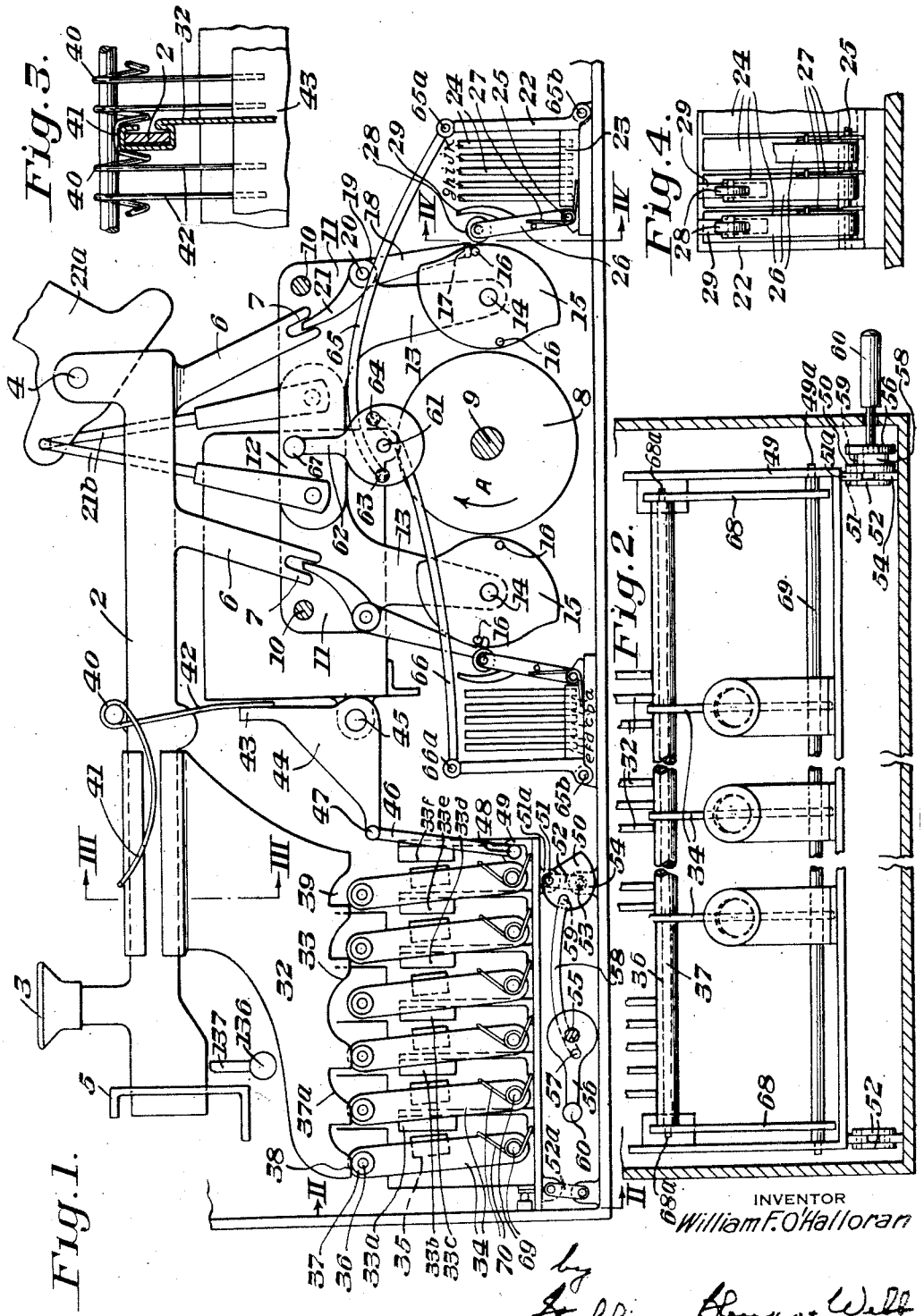

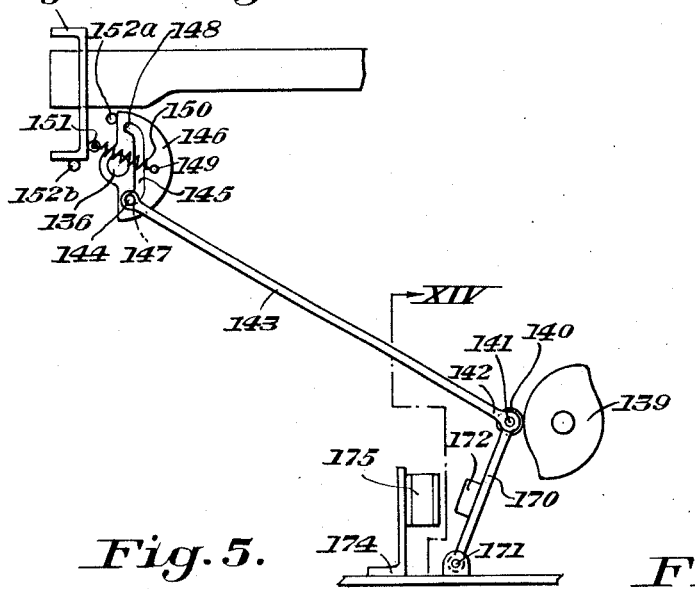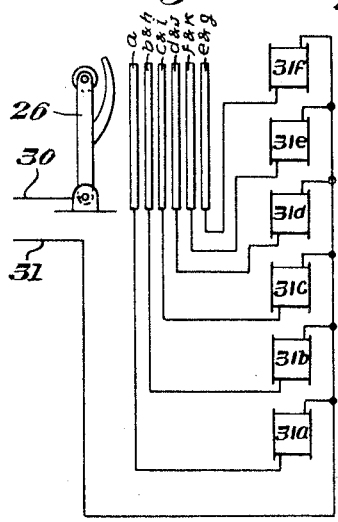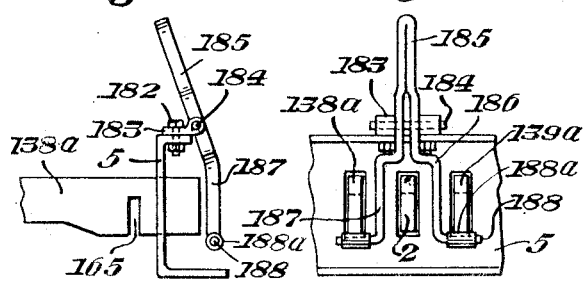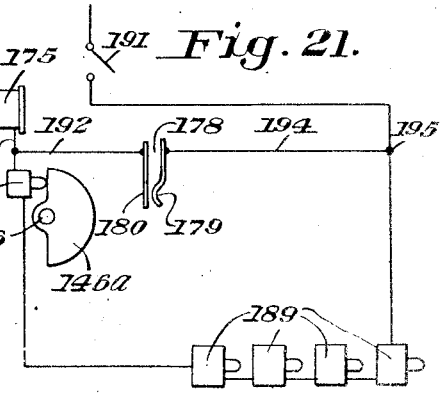

INVENTOR
William F. O'Halloran
by Stebbins, Blenko & Webb
his attorneys

Aug. 5, 1952 — W. F. O'HALLORAN — 2,605,879
AUTOMATIC TYPEWRITER

Filed Sept. 26, 1947 — 10 Sheets-Sheet 4

INVENTOR
William F. O'Halloran

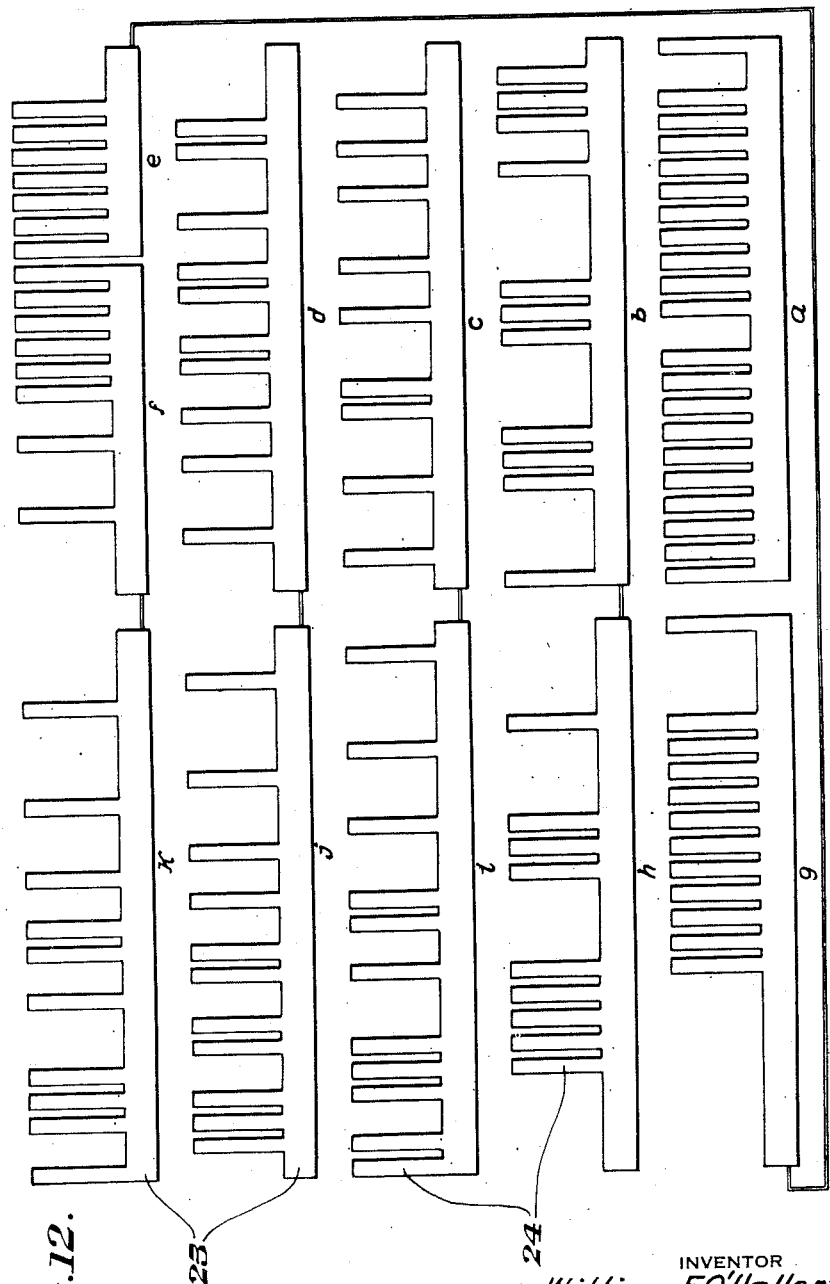

Aug. 5, 1952     W. F. O'HALLORAN     2,605,879
AUTOMATIC TYPEWRITER
Filed Sept. 26, 1947     10 Sheets-Sheet 6

INVENTOR
William F. O'Halloran

Aug. 5, 1952 W. F. O'HALLORAN 2,605,879
AUTOMATIC TYPEWRITER
Filed Sept. 26, 1947 10 Sheets-Sheet 7
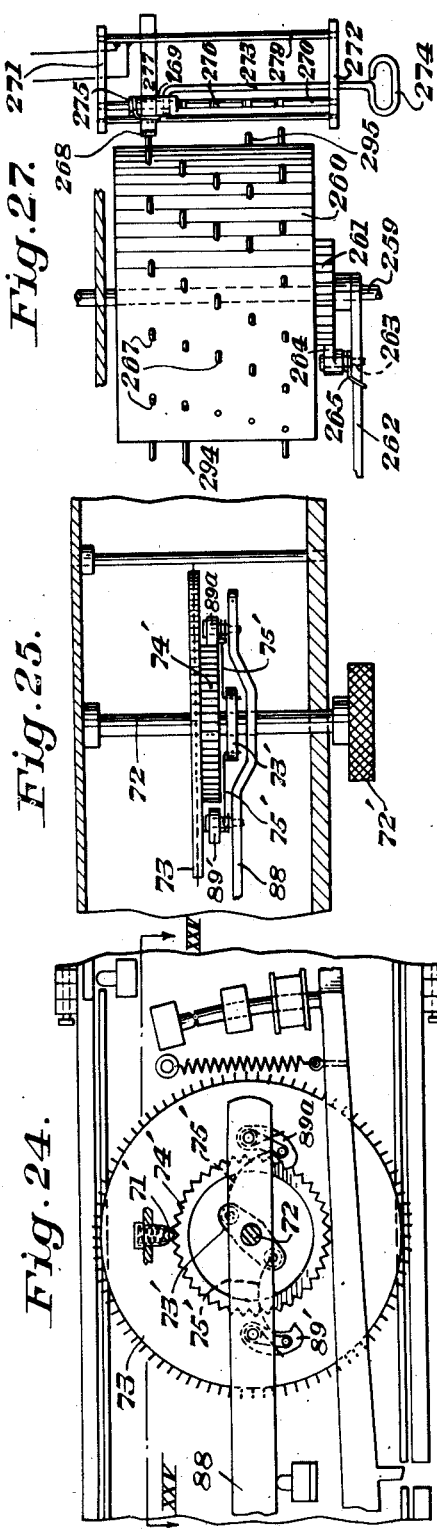
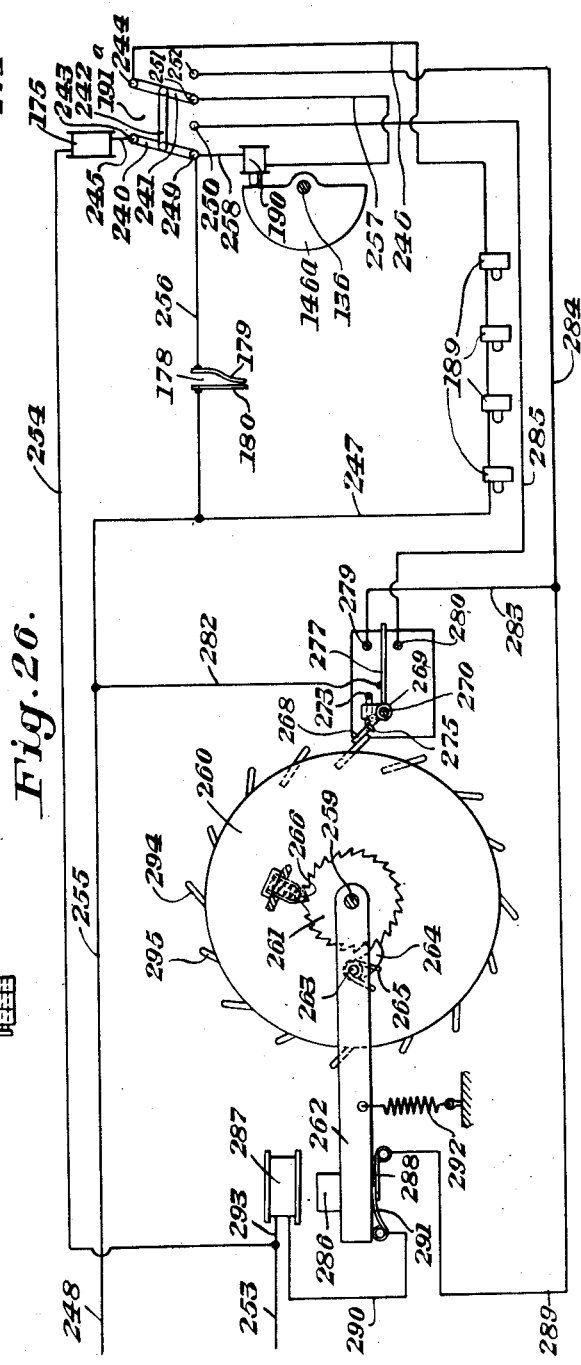
INVENTOR
William F. O'Halloran

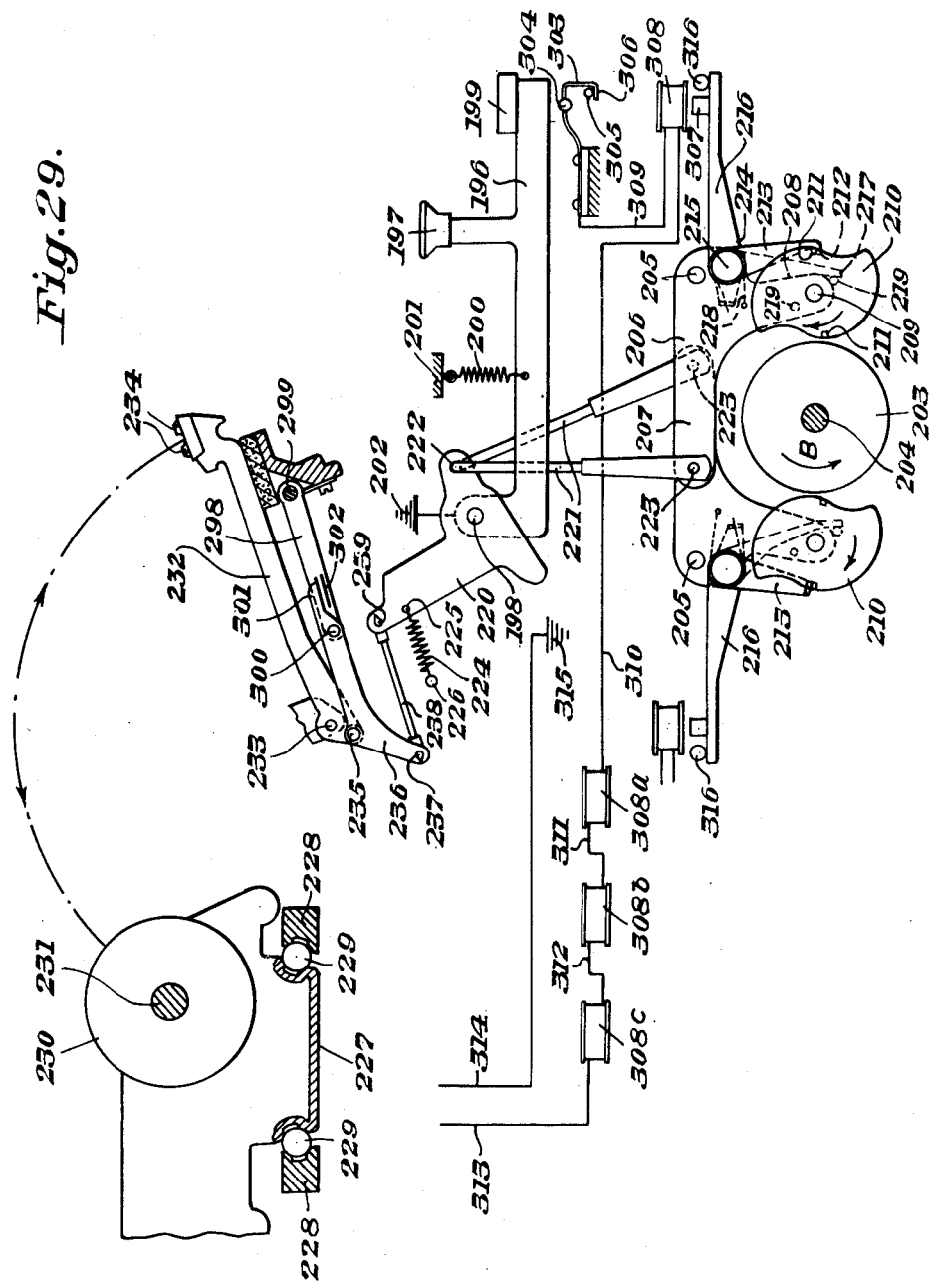

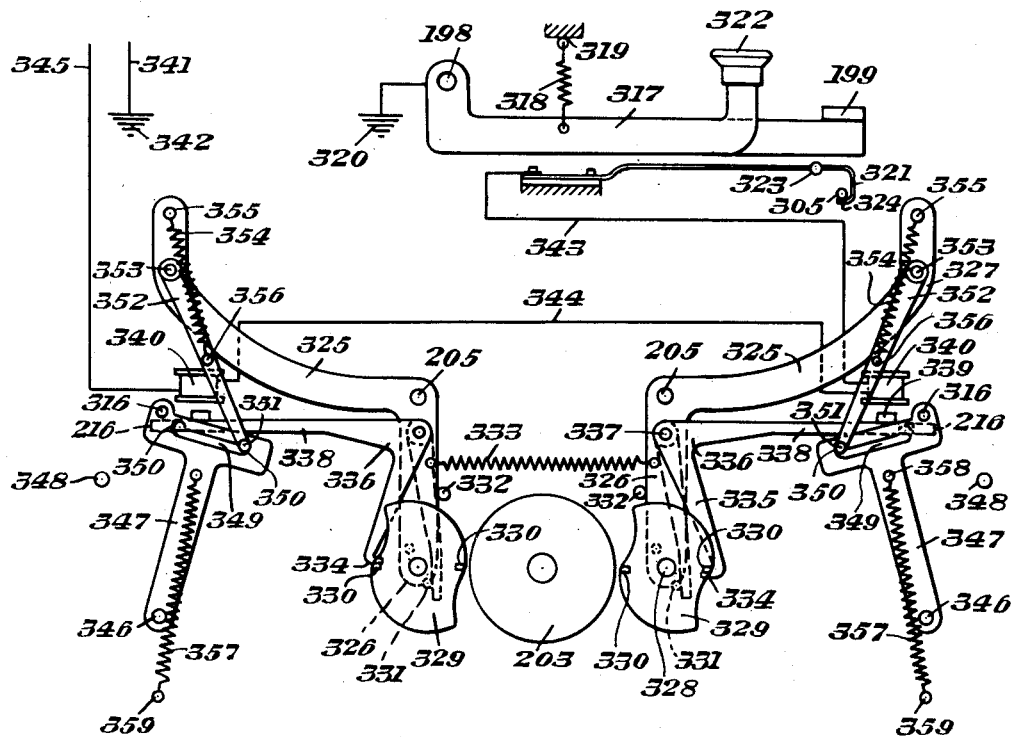
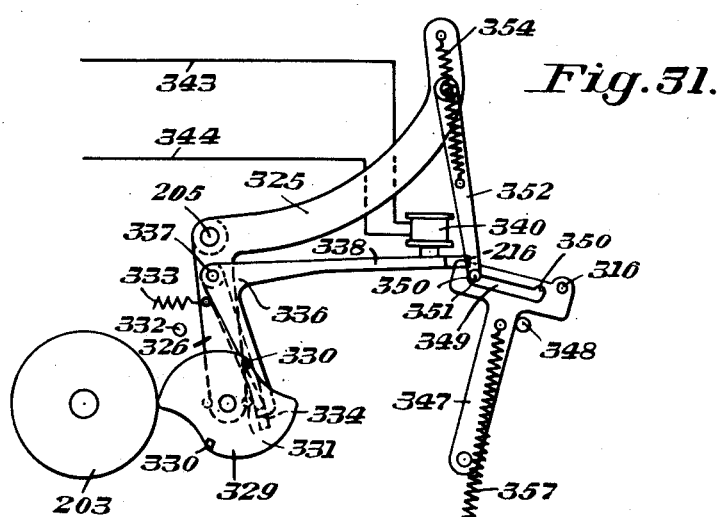

Patented Aug. 5, 1952

2,605,879

UNITED STATES PATENT OFFICE 2,605,879

AUTOMATIC TYPEWRITER

William F. O'Halloran, Greensburg, Pa.

Application September 26, 1947, Serial No. 776,219

20 Claims. (Cl. 197—20)

This invention relates to recording intelligence and more particularly to a method of and apparatus for recording intelligence whereby a plurality of records differing from one another may be made with great saving in time and labor. The invention further relates to a method of and apparatus for making with but one inditing a plurality of records which differ from one another either in that the intelligence recorded on the respective records is different or in that the spacing of the recorded intelligence is different or both.

In conduct of business it is common to prepare records which are generally similar to one another but which differ from one another either in that the intelligence recorded on the respective records is different or in that the spacing of the recorded intelligence is different or both. The various records may be made on differently arranged and sized sheets or forms. Selected intelligence may be recorded on the respective records and certain of the records may have common selected intelligence recorded thereon although its arrangement or spacing may differ.

To demonstrate the utility and commercial importance of my invention an example may be drawn from the insurance business. In casualty insurance, for example, a general agent receives from a subagent an application for insurance on a prospective policy holder. This is the first of a series of record-making steps culminating in the issuance and administration of a policy of casualty insurance. Certain of the records contain data from the policy itself, other records contain data from the application and still others contain data from other sources. All of the records carry some of the data which is on the policy and most of them carry most of it. The records are of different sizes and arrangements. A great many typings are necessary to produce all of them in accordance with present practice. According to my invention they can all be produced with but one inditing.

I list below by way of example certain records which may be employed in the casualty insurance business and all of which can be produced with but one inditing in accordance with my invention:

I. Records normally prepared in general agent's office:
1. The insurance policy in quintuplicate or sextuplicate (usually 8½" x 11" or 8½" x 14")
2. Endorsements in quintuplicate or sextuplicate (usually 8½" x 5½")
3. Invoice to agent in duplicate (usually 5" x 8")
4. Record of accounts receivable by agent (ledger)
5. Index or policyholders (usually 3" x 5")
6. Policy register and record of accounts payable by insurance company (ledger)
7. Numerical record of policies (usually 3" x 5")
8. Expiration file (usually 3" x 5")
9. Monthly statements to agents (listing)

II. Records normally prepared in subagent's office:
1. Policyholders file (usually 3" x 5")
2. Accounts receivable file (usually 3" x 5")
3. Expiration file (usually 3" x 5")
4. Policy register
5. Invoice to customer (usually 5" x 8")

III. Records normally prepared in the home office:
1. Statistical department abstract (usually 3" x 5")
2. Claims department abstract (usually 3" x 5")
3. Underwriting department abstract (usually 3" x 5")
4. Inspection department abstract (usually 3" x 5")

I provide a method of and apparatus for making dissimilar records with but one inditing which accomplishes a vast saving in time and labor. The records may be made by any suitable recording elements, as, for example, types containing characters adapted to be imprinted on paper or other record-bearing material. For example, the records may be made by typewriter, either by a series of typewriters operating simultaneously to produce dissimilar records or by a single typewriter operated a plurality of times sequentially. In either case the records are made with but a single inditing. In the process of inditing controls are interposed which determine the selection of intelligence for the respective records and the spacing of the intelligence recorded on the respective records.

One way of practicing my invention is by use of a typewriter which simultaneously makes one record and provides a control device which may be subsequently employed one or more times for making an additional record or records each of which may be the same as or different from the original record. The control device may take various forms, but in a present preferred embodiment consists of an elongated control member adapted to be employed cyclically in connection with individual controls rendered effective upon the respective cyclic operations of the elongated control member whereby it brings about the making of records which differ from one another in predetermined respects. The control member may consist of an elongated strip, as of paper or similar material, which is provided with control portions which become successively effective as the strip is moved in the direction of its length. For example, the strip may at the beginning of a recording operation be coiled upon a reel and may be drawn from that reel through mechanism which it controls and which in turn determines what characters are being recorded and then coiled up on another reel. The control portions on the strip may be indentations, perforations, markings which may be employed in connection with light sensitive recording devices, chemically active means or any other means capable of actuating mechanism for recording the predetermined characters. I at present prefer to employ a perforated paper strip, the perforations in the strip controlling the making and breaking of electrical circuits which in turn control operation of the recording elements.

When a control device such as a paper strip is to be employed the control device may be formed (e. g., perforated) either in a separate operation or simultaneously with the making of one of the records which are to be produced. I may employ a typewriter, preferably an electrically operated typewriter, with which is connected a strip or tape cutter so that as the typist operates the keys of the typewriter a typed record will be made in the typewriter and at the same time perforations will be made in the tape. The perforations thus made in the tape are subsequently employed to control the making of other records.

It is not new broadly to make a typewritten record and simultaneously cut a tape which may be subsequently used to make other records identical with the original record. I provide for cutting in the tape not only perforations which will be effective through the mechanism controlled by the tape for making subsequent records identical with the original record but also additional control perforations which may be rendered effective upon subsequent cyclic operations of the tape to cause the making of records differing from the original record and from one another in predetermined respects. There is but one inditing; all of the records are predetermined by that inditing.

If, for example, it is desired that a second record be made which has portions the same as portions of the original record but which omits matter appearing in the original record, the tape is provided with special control perforations which prevent the recording on the second record of the matter appearing on the first record which is to be omitted on the second record. The tape may also be provided with similar special perforations to eliminate matter in making of a third record, etc. Controls are provided so that upon each cyclic operation of the tape one or another of the sets of special perforations is rendered operative.

Desirably the control device which in the instanced example is a perforated paper tape is employed to control the making and breaking of electric circuits which operate an electrically operated typewriter. That typewriter may be the same typewriter as is used for making the initial record and for operating the tape cutter to cut the tape or it may be a different typewriter. If the same typewriter as was used for cutting the tape is employed certain manually operable controls which will be described below are operated to render the type bars of the typewriter responsive to electric currents flowing in the electric circuits controlled by the tape rather than to the operation of the typewriter keys by the typist. The special control perforations in the tape may operate in various ways; I at present prefer that the electric circuits whose making and breaking is controlled by the special perforations be effective for locking the type bars during passage through the record-making apparatus of the tape perforations which correspond to intelligence which is to be omitted on the record being made. Thus when the tape is being cut and a portion of the intelligence which is typed on the original record made simultaneously with cutting the tape is to be omitted from a second record a control perforation is made in the tape just before the first of the perforations corresponding to the matter to be omitted on the second record. When the second record is being made that control perforation causes locking of the type bars of the typewriter so that the perforations following the control perforation have no effect. Another control perforation may be provided at the end of the series of perforations which are to be ineffective in making the second record to unlock the type bars. The tape may be provided with like but differently patterned control perforations for accomplishing a similar function in the making of a third record and subsequent records. The record-making apparatus has controls which are operable to render the record-making apparatus selectively responsive to desired ones of the special control perforations. Thus by proper operation of the controls in the record-making apparatus different sets of special control perforations in the tape may be selectively rendered operative upon different cyclic operations of the tape to make different records.

In a similar manner the spacing of intelligence appearing on different records may be varied. Thus records of different dimensions may be made. Certain matter may appear in a single line on one record and in a plurality of lines on another record. The spacing controls are perforated into the tape in the single inditing so that they may be rendered differentially effective in the same manner as the controls for the printing of characters as explained above.

Thus I can with but a single inditing provide for the making of a plurality of records which differ from one another in at least one of the respects that (1) the intelligence recorded is different and (2) the spacing of the recorded intelligence is different. The spacing of the intelligence may be different in one or both of the directions (a) parallel to the lines in which the intelligence is arranged and (b) transversely of such lines.

I can make with but one inditing a plurality of records which differ from one another in at least one of the respects that (1) the intelligence recorded is different and (2) the spacing of the recorded intelligence is different, comprising successively performing operations each of which is adapted to initiate one of (1) recording of a character on the records and (2) shifting the position in which a character will be recorded on the records and, when it is desired to record a character on less than all of the records or shift the position in which a character will be recorded on at least one of the records on which it is to be recorded, performing a controlling operation preventing a first mentioned operation from completing the initiated function with respect to at least one of the records. That method may be performed either in the making of a plurality of records on a series of simultaneously operating recording mechanisms such as electrically operated typewriters or in the making of a plurality of records by the employment of a control device such as a perforated tape. In either case a series of impulses (e. g., electrical impulses) may be produced each of which if allowed to function normally would cause either a printing operation or a spacing operation, but certain of the impulses are interrupted before they have caused the respective operations which would be caused had they not been interrupted. For example, a particular impulse may have as its normal function to move a type bar to operative position to print a character but that normal function may be prevented by locking the type bar so that it cannot move in response to the impulse. The means for locking the type bar is predeterminedly rendered operative in the inditing. For example, when a perforated tape is employed the tape is provided during the inditing with a special perforation for locking the type bars from the time when a series of perforations corresponding to matter to be deleted from the record being made begin to pass through the mechanism controlled by the tape. When that series of perforations has passed another special perforation unlocks the type bars.

Among the normal perforations which may be provided in the tape are perforations for effecting tabular movements of the typewriter carriage and perforations for effecting carriage return movements. A carriage return movement is always accompanied by turning of the platen roller to advance the paper. My method and apparatus are especially useful in the making of dissimilar tabulations, i. e., records in which the material recorded is arranged in columns, material in different columns in the original record being selected for the making of subsequent records. For example, the original record may consist of a tabulation consisting of seven columns of data. In a subsequent record the odd numbered columns only may be recorded and in still another record the even numbered columns only may be recorded, etc. Thus in the making of a record after the first record certain columns appearing on the first record are omitted. This omission may be brought about in the way explained above by the provision of special perforations in the tape. However, it is possible by the use of special control mechanism, which will be described below, to employ the perforations in the tape for causing tabular movements of the carriage as special control perforations. In this way I can with but one inditing make a plurality of records at least one of which contains only selected correspondingly arranged items from successive groups of uniformly arranged indited items by successively performing operations each of which is adapted to initiate one of (1) recording of an item on the records and (2) shifting the position on the records in which an item will be recorded in one of the directions (a) parallel to the lines in which the items are arranged and (b) transversely of such lines, performing controlling operations preventing completion of recording on said record of the items not selected for that record and performing other controlling operations preventing completion of certain shifting operations whereby in that record the selected items from each group will be similarly arranged.

I further provide for making with but one inditing a plurality of records at least one of which contains only selected correspondingly arranged items from successive multiline groups of uniformly arranged indited items by successively performing operations each of which is adapted to initiate one of (1) recording of an item on the records and (2) shifting the position on the records in which an item will be recorded in one of the directions (a) parallel to the lines and (b) transversely of the lines, performing controlling operations preventing completion of recording on said record of the items not selected for that record and performing other controlling operations preventing completion of shifting of the position on said record in the direction transversely of the lines in which items other than the first of the items from each group selected for that record will be recorded, whereby in that record the selected items from each group will be arranged in a single line with the corresponding selected items from the respective groups arranged in columnar fashion. I still further provide a method of making with but one inditing a plurality of records one of which contains all items of successive groups of uniformly arranged indited items and another of which contains only selected correspondingly arranged items from said successive groups comprising successively performing operations each of which is adapted to initiate one of (1) recording of an item on the records and (2) shifting the position on the records in which an item will be recorded in one of the directions (a) parallel to the lines in which the items are arranged and (b) transversely of such lines, completing said operations to record all of said items on the first mentioned record, performing controlling operations preventing completion of recording on the second mentioned record of the items not selected for that record and performing other controlling operations preventing completion of certain shifting operations whereby on the second mentioned record the selected items from each group will be similarly arranged.

I also provide a method of making with but one inditing a plurality of records at least one of which contains only selected correspondingly arranged items from successive groups of uniformly arranged indited items comprising successively performing operations each of which is adapted to initiate recording of an item on the records and performing controlling operations preventing completion of recording on said record of the items not selected for that record.

I provide for correcting errors made in forming the control device or perforated tape. If through error the tape moving through the tape cutter is wrongly perforated I move the tape in the reverse direction and delete all the perforations until the first incorrect perforation is reached, the deletion being effected by the application of further perforations to render those perforations ineffective. The tape is then advanced beyond the portion thus perforated and the making of the tape progresses from that point.

My invention involves numerous complexities which it is not feasible to detail in this preliminary portion of the specification but which will be referred to at length below. Many other details, objects and advantages of the invention will become apparent as the following description of certain present preferred embodiments thereof and certain present preferred methods of practicing the same proceeds.

In the accompanying drawings I have shown certain present preferred embodiments of the invention and have illustrated certain present preferred methods of practicing the same, in which:

Figure 1 is a fragmentary side elevational view of an electrically operated typewriter having means for closing electric circuits to operate a tape cutter and having means adapted to be operated by electric impulses controlled by a previously cut tape whereby the typewriter may be operated;

Figure 2 is a fragmentary vertical cross-sectional view taken on the line II—II of Figure 1;

Figure 3 is a fragmentary vertical cross-sectional view taken on the line III—III of Figure 1;

Figure 4 is a fragmentary vertical cross-sectional view taken on the line IV—IV of Figure 1 but to somewhat enlarged scale;

Figure 5 is a diagram showing electrical connections through which the tape cutter is operated by the typewriter;

Figure 9 is a diagram showing electrical connections operable by a previously cut tape for operating the typewriter;

Figure 12 is a diagram showing portions of the electrical connections through which the tape cutter is operated by the typewriter;

Figure 13 is a fragmentary view of a portion of the typewriter mechanism;

Figure 14 is an enlarged vertical cross-sectional view taken on the line XIV—XIV of Figure 13;

Figure 15 is a largely diagrammatic view of a portion of the typewriter structure;

Figure 16 is a fragmentary elevational view of a portion of the typewriter structure;

Figure 17 is a view similar to Figure 16 and of the same structure but showing the structure in a different operative position;

Figure 18 is a view similar to Figure 16 of a different portion of the typewriter structure;

Figure 19 is a view similar to Figure 18 and of the same structure but showing the structure in a different operative position;

Figure 20 is a vertical cross-sectional view taken on the line XX—XX of Figure 16 but to enlarged scale;

Figure 21 is a diagram illustrating electrical connections for mechanism for tabulating selected matter;

Figure 22 is a fragmentary elevational view showing mechanism for locking certain of the levers when the mechanism illustrated in Figure 21 is to be employed;

Figure 23 is an elevational view of the mechanism shown in Figure 22 as viewed from the right in Figure 22;

Figure 24 is a fragmentary side elevational view showing a modified form of structure for advancing the tape which may be employed in place of the structure shown at the center of Figure 10 and which provides for retrograde movement of the tape to correct errors made in perforating it;

Figure 25 is a horizontal cross-sectional view taken on the line XXV—XXV of Figure 24;

Figure 26 is an elevational view, largely diagrammatic, of mechanism for tabulating selected matter, such mechanism being usable in place of that illustrated in Figure 21;

Figure 27 is a fragmentary plan view of a portion of the structure shown in Figure 26;

Figure 29 is a view partly in cross-section perpendicular to the length of the carriage and partly diagrammatic of the master typewriter of a series of electrically connected typewriters showing structure for operating the typewriters simultaneously;

Figure 6:
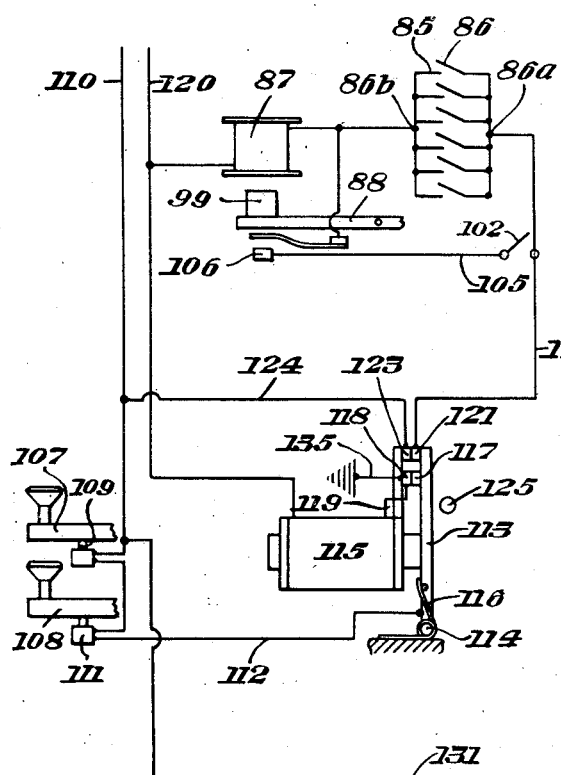
Figure 6 is a view consisting in part of a fragment of the typewriter structure and in part of a diagram showing electrical connections operated thereby.

Figure 30 is a largely diagrammatic view generally similar to Figure 15 of a portion of the structure of each of the typewriters which are electrically connected in series and showing particularly the locking mechanism for selectively rendering inoperative the means for operating the type bars; and Figure 31 is a fragmentary view of a portion of the mechanism shown in Figure 30 in a different operative position.

As indicated above, my method may in its broader aspects be practiced either on apparatus consisting of a plurality of recording devices such as typewriters connected together or on apparatus involving a control device such as a perforated tape which may be employed cyclically for making a number of records. When a plurality of typewriters are used they may be connected together either electrically or mechanically. I prefer to employ electrically operated typewriters and to connect them together electrically. When a tape cutter is employed I prefer to operate the tape cutter by impulses, preferably electrical impulses from a typewriter, preferably an electrically operated typewriter, and I prefer to employ the perforated tape for making and breaking electric circuits to operate an electrically operated typewriter for making records from the tape.

In Figures 1 to 28, inclusive, of the drawings there is shown mechanism consisting of an electrically operated typewriter which may be employed to operate a tape cutter and which may in turn be operated to make a record by a previously cut tape. In Figures 29 to 31, inclusive, there is shown diagrammatically apparatus consisting of a plurality of typewriters electrically connected together for simultaneously making dissimilar records. Thus a number of dissimilar records may be made at the same time by use of the apparatus of Figures 29–31, while with the apparatus of Figures 1–28 the tape must be run through the control mechanism one time for each different record to be made. The apparatus of Figures 29–31 has some advantage in speed while the apparatus of Figures 1–28 has the advantage that only one typewriter and one tape cutter are needed. Generally speaking, the apparatus of Figures 1–28 is recommended although there may be cases where speed of production of dissimilar records is of greater importance than cost of equipment and in those cases the apparatus of Figures 29–31 is recommended.

Referring first to the form of apparatus shown in Figures 1–28, Figures 1, 2, 3 and 4 are general views of the typewriter portion of the apparatus. The typewriter is adapted for operating the tape cutter to cut a tape and it is also adapted to be operated by a previously cut tape to make a record. When the typewriter is operated to cut a tape it may also make a record at the same time as the tape is being cut.

The typewriter comprises a plurality of key levers 2 each having a key 3. Each of the key levers is pivoted at 4 and when operated turns in the counterclockwise direction about the axis of the pivot 4, viewing Figure 1. The amplitude of movement of the extremity of each key lever 2 is limited by a stop member 5. Each key lever has a generally downward extension 6 having a forked lower end 7. The downward extensions 6 of adjacent key levers 2 are differently positioned, alternate extensions 6 being disposed relatively near to the pivoted ends of the key levers and being inclined downwardly and toward the right, viewing Figure 1, and alternate extensions 6 being disposed relatively remote from the pivoted ends of the key levers and being inclined downwardly and toward the left, viewing Figure 1. This is done so that the mechanism with which the key levers cooperate may be divided into two opposed groups, enabling substantial reduction in the dimension of the typewriter parallel to the axis of the pivot 4.

There is provided a roller 8 mounted upon an axle 9 whose axis is parallel to the axis of the pivot 4. The roller 8 extends continuously throughout the width of the typewriter and is of uniform diameter throughout. It is constantly power driven to turn in the direction of the arrow A in Figure 1 when the typewriter is in use. There are provided two pivot rods 10, each having its axis parallel to the axis of the roller 8. On each of the rods 10 is pivoted a series of bell crank levers 11 which are arranged alternately, the right hand bell crank levers, viewing Figure 1, cooperating with the right hand extensions 6 and the left hand bell crank levers cooperating with the left hand extensions 6. Each of the bell crank levers 11 has a generally horizontally extending arm 12 and a generally downwardly extending arm 13. Pivoted to each arm 13 to 14 is a cam 15. Each of the cams 15 is symmetrical, having two opposed surface portions which extend from a position relatively near the axis of the pivot 14 to a position relatively remote from the axis of the pivot 14. Each cam 15 has two diametrically opposite stop pins 16 adapted sequentially to cooperate with a stop 17 at the lower extremity of an arm 18 of a bell crank lever 19 pivoted at 20 to the corresponding bell crank lever 11. Each bell crank lever 19 has a generally upwardly extending arm 21 which enters the forked lower end 7 of the downward extension 6 of one of the key levers 2.

The typewriter is provided with types carried by pivoted type bars which may be of known or any desired construction and which do not per se constitute the present invention and hence are not shown in Figure 1. Types and type bars and mechanism for operating them similar to the mechanism shown in Figure 1 are shown in Figure 29 and the types, type bars and directly cooperating mechanism of the typewriter shown in Figure 1 may be the same as in Figure 29. Referring to Figure 1, each type bar is connected by a link with a bell crank lever 21a which is in turn connected by a link 21b with the generally horizontally extending arm 12 of one of the bell crank levers 11. The bell crank levers 21a are uniform and uniformly positioned, being mounted upon the pivot rod 4 which pivotally carries the key levers 2. The bell crank levers 21a are arranged alternately with the key levers 2. Alternate bell crank levers 21a are connected by links 21b with right hand bell crank levers 11, viewing Figure 1, and alternate bell crank levers 21a are connected by links 21b with left hand bell crank levers 11, viewing Figure 1.

Each of the cams 15 is normally urged to turn in the counterclockwise direction, viewing Figure 1. The means for thus urging the cams may be any known or preferred means and does not per se constitute the present invention and hence is not shown in Figure 1. Such means is, however, shown in Figure 29 and the same means may be employed in Figure 1. When a key is pressed by the operator its key lever 2 turns through a small angle in the counterclockwise direction about the axis of the pivot rod 4, swinging the corresponding extension 6 toward the right and in turn swinging the corresponding bell crank lever 19 so that its generally downwardly extending arm 18 swings toward the left to move the corresponding stop 17 out of operative position with respect to the stop pin 16 lying thereagainst, thus permitting the corresponding cam 15 to turn through approximately 180° before it is again brought to rest. After the cam turns through a few degrees one of its opposed surface portions engages the constantly rotating roller 8. Power from the roller 8 is transmitted through the cam 15 and the bell crank lever 11 carrying the cam 15 is caused to turn about the axis of its pivot rod 10 to draw downwardly the corresponding link 21b and through the mechanism above referred to operate a type bar to cause a type to make its impression on a record sheet disposed in the typewriter in the normal way.

The typewriter mechanism above described may be of known construction and I do not claim to be the inventor thereof per se. However, I have adapted that mechanism for a new use in combination with other mechanism now to be described.

I utilize the surface portion of each cam 15 which is opposed to the surface portion in contact with the roller 8 at any given time to operate mechanism now to be described. There are provided two mounting members 22, one beside each series of cams, each of the mounting members having mounted therein a series of five strips 23 each having spaced upwardly projecting fingers 24. The strips 23 are insulated from each other at the bottom. The fingers 24 are arranged in series or piles, one opposite each of the cams 15, but in each such series or piles the number of fingers may vary and the fingers which are present are carried by various strips. Opposite each series or pile of fingers 24 is pivoted at 25 a lever 26 which is normally spring pressed away from the fingers by a spring 27. At its upper end each lever carries a cam following roller 28 which is adapted to follow the corresponding cam 15. Each lever 26 also has a projection 29 opposite the corresponding series or pile of fingers 24. When the cam opposite one of the levers 26 turns through approximately 180° it actuates that lever through the roller 28 carried thereby, pushing it toward and against the series of fingers 24 in alignment therewith so as to close an electrical circuit through each finger as will be described.

The strips 23 with the fingers 24 projecting upwardly therefrom are shown in Figure 12. There are altogether eleven strips designated in Figure 12 by letters a, b, c, d, e, f, g, h, i, j and k, respectively. The relative positions of these strips are shown in Figure 1. Strips e and f are in alignment at one side of the mechanism as indicated in Figure 12. The strips are permanently electrically connected together as shown in Figure 12 and as follows:

Strips b and h
Strips c and i
Strips d and j
Strips f and k
Strips e and g
Strip a is not permanently electrically connected with any other strip.

Referring now to the wiring diagram, Figure 5, a lead 30 from a source of electric current is electrically connected with all of the levers 26. The other lead 31 from the source of electric current is connected to a series of six solenoids 31a, 31b, 31c, 31d, 31e and 31f which are arranged in parallel. The strip a is electrically connected with the solenoid 31a; the strips b and h are electrically connected with the solenoid 31b; the strips c and i are electrically connected with the solenoid 31c; the strips d and j are electrically connected with the solenoid 31d; the strips f and k are electrically connected with the solenoid 31e; and the strips e and g are electrically connected with the solenoid 31f.

When one of the levers 26 is operated by the corresponding cam 15 it closes an electric circuit through all of the strips having fingers in the pile opposite the lever. This in turn results in energizing of those of the solenoids 31a, 31b, 31c, 31d, 31e and 31f which are electrically connected with those strips. The arrangement of the fingers 24 is such that upon operation of each lever 26 an electric circuit is closed through a different finger or combination of fingers. When it is borne in mind that a different lever 26 is actuated upon operation by the operator of each key 3 it will be appreciated that operation of a key 3 brings about through the mechanism which has been described energization of a solenoid or combination of solenoids distinctive for that particular key.

Fastened to each key lever 2 is a mask 32. The lower edge of each mask is serrated as shown at 33. Below the mask are mounted six solenoids 33a, 33b, 33c, 33d, 33e and 33f. Mounted in cooperative relationship with the respective solenoids 33a, 33b, 33c, 33d, 33e and 33f are six levers 34 each carrying a core 35 for cooperation with one of the solenoids. Each lever carries at its upper end a bar 36 having an anti-friction roller 37 thereon, the bars 36 extending at right angles to the masks 32 so that each bar extends beneath the same portion of all of the masks. The bars 36 and the levers 34 carrying them are shown in Figure 1 in their normal positions in which they are not operated by the solenoids 33a, 33b, 33c, 33d, 33e and 33f. The levers are maintained in their normal positions by springs 70 which normally urge them in the counterclockwise direction about their respective pivots 69, viewing Figure 1. The serrated bottom edge of each mask is formed so that when a particular lever or combination of levers 34 is or are moved in the clockwise direction about the pivot or pivots 69 thereof, viewing Figure 1, by operation of one or more of the solenoids 33a, 33b, 33c, 33d, 33e and 33f the corresponding bar and roller or bars and rollers 36 and 37 will lie opposite a recess or recesses in the bottom edge of the mask thus permitting the mask to move downwardly, viewing Figure 1, and in turn permitting turning of the key lever 2 carrying the mask in the counterclockwise direction about the axis of the pivot rod 4 whereby the key lever operates the corresponding type to record the same on the record sheet. Particular masks have projections 38 above certain rollers 37 when the corresponding levers 34 are in normal position and have recesses 39 above other rollers 37 when the corresponding levers 34 are in normal position. To render a mask downwardly movable only those levers 34 must be moved in the counterclockwise direction which when in normal position have their respective rollers 37 disposed below projections 38. The respective levers 34 are moved in the clockwise direction by energizing of their solenoids. Thus each mask requires a particular arrangement of bars below it to permit the mask to move downwardly.

There is provided a spring 40 having portions 41 adapted when the spring is in operative position to press downwardly on the respective key levers 2 and portions 42 adapted to bear against a generally vertically projecting arm 43 of an operating member 44 pivoted to a stationary part at 45 and having a link 46 pivoted thereto at 47, the opposite end of the link 46 being pivoted at 48 to a support 49 which carries the pivots 69 for the levers 34. Disposed beneath the support 49 is a cam 50 pivoted by a pivot pin 51 to lugs 51a carried by the support 49. The pivot pin 51 also passes through one end of a link 52 whose opposite end is pivoted by a pivot pin 53 to a bracket 54 carried by a stationary part of the typewriter. There are also provided other links 52a similar to the link 52 and similarly connected with the support 49 and with the frame, the link 52 and the links 52a constituting a parallelogram motion through which the support 49 is carried on the frame. Mounted in a stationary part is a pin 55 to which is pivoted an operating lever 56 to which is in turn pivoted at 57 a link 58 pivoted to the cam 50 at 59. A handle 60 is carried by the operating lever 56 to facilitate turning it. When the operating lever 56 is turned through approximately 180° in the clockwise direction about the axis of the pin 55, viewing Figure 1, the link 58 moves the cam 50 toward the right about the axis of the pin 51, permitting the links 52 and 52a to assume a generally horizontal position with consequent lowering of the support 49. The vertical position of the support 49 is determined by the position of the cam 50 whose lower portion rests upon a stationary part of the typewriter frame. When the support 49 is lowered the bars 36 and rollers 37 move to a position in which they are out of cooperative relationship with the masks 32. At the same time the link 46 turns the operating member 44 in the counterclockwise direction about the axis of the pivot 45 to remove the tension from the spring 40 and render the same inoperative. This occurs because the generally vertically projecting arm 43 of the operating member 44 is moved toward the left, viewing Figure 1, permitting the spring portions 42 to move in a similar direction until all downward spring pressure on the key levers is relieved.

When the typewriter is being used to make a record from a previously cut tape the cam 50 and associated mechanism just described are in the position shown in Figure 1. When the typewriter is being used for the purpose of cutting a tape the operating member 56 is operated as above described to move the bars 36 and rollers 37 to positions in which they are out of cooperative relationship with the masks and also to render the spring 40 inoperative.

Pivoted to a stationary part at 61 is an operating lever 62 to which are pivoted at 63 and 64, respectively, links 65 and 66 which in turn are pivoted respectively at 65a and 66a to the respective mounting members 22. Each mounting member 22 is pivoted at 65b to a stationary part of the typewriter frame. The operating lever 62 has a handle 67. Upon turning the operating lever 62 in the clockwise direction, viewing Figure 1, through an angle of approximately 180° the mounting members 22 are swung outwardly about the respective pivots 65b to inoperative position so that operation of the cams 15 does not cause operation of the levers 26. The mounting members 22 are disposed in the position shown in Figure 1 when the typewriter is being used for cutting a tape. They are disposed in their outward inoperative positions when the typewriter is being used to make a record from a previously cut tape. It is possible, however, for the typewriter to be used to make a record from a previously cut tape and at the same time cut a second tape; under those particular circumstances both of the operating levers 56 and 62 occupy the position in which they are shown in Figure 1.

As explained above, each of the levers 34 is urged by its spring 70 to turn in the counterclockwise direction about the axis of its pivot 69. When a solenoid 33a, 33b, 33c, 33d, 33e or 33f which has been energized is de-energized this permits the corresponding lever 34 to be moved by its spring 70 so as to turn in the counterclockwise direction, the anti-friction rollers 37 engaging the inclined portions 37a of the serrated bottom surfaces of the masks 32 to in effect cam the masks upwardly and hence return the key levers 2 to their upper or normal positions as shown in Figure 1.

Referring particularly to Figure 2, the bars 36 have their ends 68a mounted in levers 68 pivoted on the shafts 69 which are mounted in the support 49 at 49a. The anti-friction rollers 37 are disposed between the levers 34 and the levers 68. The solenoids 33a, 33b, 33c, 33d, 33e and 33f are not all arranged in a straight line but are staggered so that the magnetic field of any solenoid does not move the code 35 intended to be moved by another solenoid. The solenoids may, for example, be arranged in three lines with two solenoids in each line as shown in Figure 2. This is possible because each of the bars 36 extends throughout the entire width of the typewriter and the lever 34 and the solenoid for operating it may be disposed at any point along the bar.

The levers 34 and 68 are fixed to the shafts 69 so that upon movement of any lever 34 by its solenoid the entire assembly comprising that lever, the corresponding shaft 69, the corresponding levers 68 and the corresponding rod 36 are moved in unison. Operation of one of the solenoids 33a, 33b, 33c, 33d, 33e and 33f thus causes swinging of the corresponding bar 36 in an arc about the axis of the corresponding shaft 69.

The solenoids 31a, 31b, 31c, 31d, 31e and 31f are not shown in Figure 1 and are indicated only diagrammatically in the wiring diagram, Figure 5. They are shown in structural relationship to the elements cooperating therewith in Figures 10 and 11 which show a machine which is a combination tape cutter and typewriter actuator; in other words, the machine of Figures 10 and 11 can be used selectively for cutting a tape and for actuating a typewriter by use of a previously cut tape.

The machine of Figures 10 and 11 will first be described in relation to its tape cutting function. There is provided a frame 71 in which is journaled a cross-shaft 72 on which is mounted for rotation a toothed wheel 73 and a ratchet 74. The toothed wheel and ratchet always rotate together; either they may both be keyed to the cross-shaft 72 or they may be fastened together and rotate freely on the cross-shaft 72. The teeth of the toothed wheel 73 project through openings 73a and 73b at the top and bottom respectively of the frame 71. A tape confining member 75 is disposed above and parallel to the top of the frame 71, as viewed in Figure 10, and another tape confining member 76 is disposed below and parallel to the bottom of the frame 71 as viewed in that figure. Each of the tape confining members 75 and 76 is at its central portion spaced from the frame a distance only slightly greater than the thickness of the tape whereby to maintain the tape substantially against the outside of the frame and hence in position to be advanced by the toothed wheel 73 upon turning thereof. Each of the tape confining members 75 and 76 is of generally channel shape in transverse cross-section to receive the longitudinally disposed tape and guide it against skewing. The toothed wheel 73 turns only in the counterclockwise direction, viewing Figure 10, except in correcting errors. It is to be understood that at any given time it moves the tape either toward the left above the frame, i. e., between the top of the frame and the tape confining member 75 or toward the right below the frame, i. e., between the bottom of the frame and the tape confining member 76, or both simultaneously in case a record is being made from a previously cut tape and another tape is being cut at the same time.

Mounted in the frame 71 is a cross-shaft 77 on which are pivoted six levers 78, each carrying a punch 79 adapted when the lever is turned in the clockwise direction about the axis of the shaft 77 to move through a perforation 80 in the bottom of the frame and into a perforation 81 in the tape confining member 76 to make a perforation in a tape disposed between the frame and that tape confining member. The solenoids 31a, 31b, 31c, 31d, 31e and 31f are stationarily mounted in the frame in the arrangement shown in Figures 10 and 11. Each of the levers 78 has an upwardly projecting arm 82 which is curved about the axis of the shaft 77 and which carries a core 83.

Thus when one of the solenoids is energized the corresponding core 83 is drawn downwardly and the corresponding lever 78 is turned in the clockwise direction about the axis of the shaft 77 to cause the corresponding punch 79 to perforate the tape. The levers 78 are normally urged in the counterclockwise direction about the axis of the shaft 77 by coil springs 84, one for each lever. The upward movement of each lever is limited by a switch 85 having a movable contact member 86. When each of the solenoids 31a, 31b, 31c, 31d, 31e and 31f is de-energized and hence when the corresponding lever 78 is in its uppermost position as shown in Figure 10 the upper end of the corresponding arm 82 is pressed against the movable contact member 86 of the corresponding switch 85 by the corresponding spring 84. Then the switch is open and no current flows through it. When one of the solenoids 31a, 31b, 31c, 31d, 31e and 31f is energized it draws the corresponding core 83 downwardly as above explained and perforates the tape and at the same time draws the upper end of the arm 82 away from the corresponding contact member 86. That contact member 86 is thereupon spring projected to close an electric circuit through the switch 85. Figure 6 shows the electrical connections.

Referring to Figure 6, the six switches 85 are shown as being arranged in parallel. When one or more of the solenoids 31a, 31b, 31c, 31d, 31e and 31f is or are energized and one or more of the levers 78 is or are thereupon moved in the clockwise direction about the axis of the shaft 77 at least one of the switches 85 is closed and current may flow between a point 86a and a point 86b. Closing of the circuit from 86a to 86b energizes a solenoid 87 (see also Figure 10). A bar 88 is pivoted to the shaft 72 and carries a pawl 89 adapted to operate the ratchet 74. An escapement 90 pivotally mounted on the frame also co-operates with the ratchet 74 and insures advance of the ratchet through only a predetermined angular distance (one or more teeth) for each operation of the pawl 89. Mounted on the frame are stops 91 and 92 limiting the amplitude of movement of the bar 88. A tension coil spring 93 is connected with the bar 88 through a pin 94 carried by the bar and with a bracket 95 carried by the frame through a pin 96 carried by the bracket, the spring 93 urging the bar 88 downwardly, i. e., to turn in the counterclockwise direction about the axis of the shaft 72. A counterweight 97 is provided on the bar 88 and may be adjusted along the bar to any desired position and maintained in adjusted position by a set screw 98.

The bar 88 carries a core 99 positioned in the magnetic field of the solenoid 87. When the solenoid 87 is energized by the closing of one or more of the switches 85 it draws the core 99 upwardly and hence turns the bar 88 through the angle permitted by the stops 91 and 92 in the clockwise direction about the axis of the shaft 72, viewing Figure 10. This causes the pawl 89 to ride freely in the reverse direction over one or more teeth of the ratchet 74. The pawl 89 is spring pressed against the ratchet 74 by a spring 89a. As long as one of the switches 85 remains closed the bar 88 remains up. When any lever 78 which had been drawn downwardly to perforate the tape returns to its uppermost position as shown in Figure 10 the upper end of the corresponding arm 82 opens the corresponding switch 85 which had been closed, resulting in de-energizing of the solenoid 87. Thereupon the bar 88 is moved downwardly by the spring 93. This causes the pawl 89 to turn the ratchet 74 a predetermined angular distance in the counterclockwise direction about the axis of the shaft 72, viewing Figure 10. Since the toothed wheel 73 always rotates with the ratchet 74 the toothed wheel is at the same time turned through the same angular distance. The teeth of the toothed wheel pass through the tape and for each angular movement of the toothed wheel as above described the tape is advanced one step. The tape is perforated while standing still and is advanced step by step intermediate perforating operations. The openings in the tape through which the teeth of the toothed wheel 73 pass may be preformed or they may be formed at the time of the operation by the teeth of the toothed wheel 73. Those openings are preferably disposed along the center line of the tape and are not to be confused with the perforations made in the tape by the punches 79.

Figure 10:
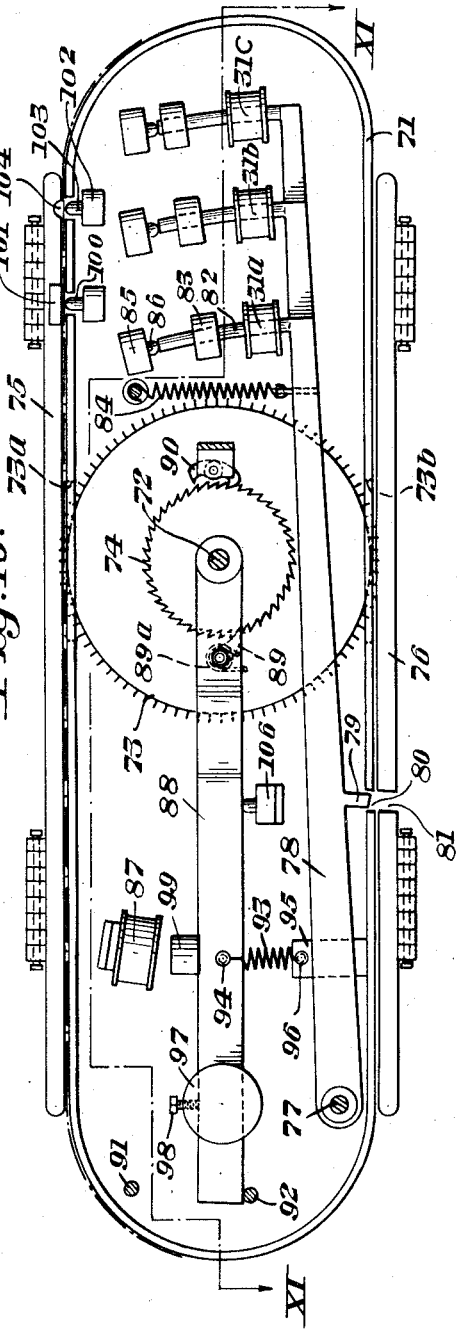
Figure 10 is a side elevational view of the tape cutter which also functions as a portion of the mechanism through which operation of the typewriter controlled by a previously cut tape may be effected.
Figure 11:
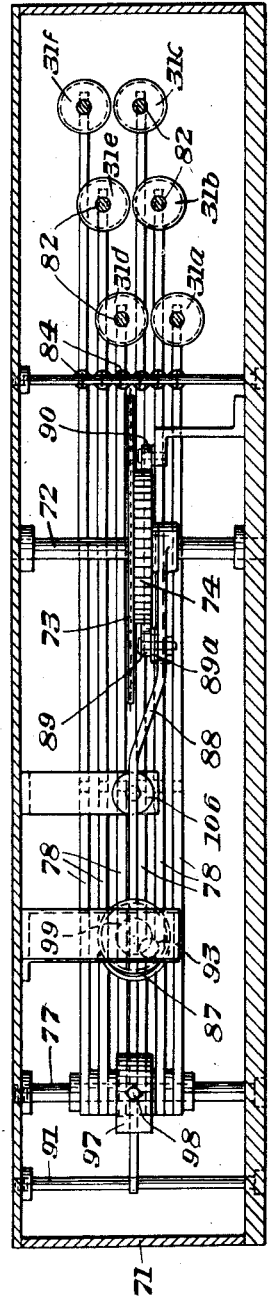
Figure 11 is a horizontal cross-sectional view taken on the line XI—XI of Figure 10.

When the mechanism of Figures 10 and 11 is to be used for actuating a typewriter to make a record from a previously perforated tape the tape is threaded into the machine of Figures 10 and 11 between the top of the frame 71 and the tape confining member 75, the tape being arranged for movement from right to left, viewing Figure 10. Mounted in the frame are six spring pressed contact members 100 arranged in a row transversely of the tape, each of the contact members 100 being in registry with one longitudinal series of perforations in the tape. Mounted opposite the outer extremities of the contact members 100 is a contact plate 101. Each of the contact members 100 is normally pressed outwardly by its spring to contact the plate 101. When a contact member 100 is in contact with the plate 101 a circuit is closed through that contact member and the plate and through one of the solenoids 33a, 33b, 33c, 33d, 33e and 33f (see Figure 9), each of the contact members being thus related to one of those solenoids. The action resulting from operation of those solenoids has been described above. Thus as a previously perforated tape is advanced step by step between the contact members 100 and the plate 101 those contact members which are opposite perforations in the tape will pass through those perforations and engage the plate. Those contact members which are not opposite the perforations in the tape are maintained out of contact with the plate by the material of the tape.

There is provided in the frame a switch 102 comprising a spring pressed contact member 103 which is normally projected by its spring toward the tape. Opposite the contact member 103 the tape confining member 75 has a cavity 104 which when no tape is interposed between it and the contact member 103 receives the end of the contact member. When the contact member 103 is projected by its spring into the cavity 104 it opens the switch 102. When a tape is interposed between the contact member 103 and the tape confining member 75 the tape holds the contact member 103 in its downward position, viewing Figure 10, maintaining the switch 102 closed. The purpose of the switch 102 is to open a circuit, presently to be described, when the trailing end of a tape has passed through the mechanism, allowing the contact member 103 to be projected as above described.

When a tape is in position to maintain the switch 102 closed the toothed wheel 73 will be automatically operated to advance the tape step by step. When the bar 88 is in its lowermost position as shown in Figure 10 it closes a switch 106 which is connected by a lead 105 with the switch 102. Closing of the switch 106 energizes the solenoid 87. Energizing of the solenoid 87 draws upwardly the core 99 and hence the bar 88. But upward movement of the bar 88 allows the switch 106 to open, which in turn results in de-energizing of the solenoid 87 and returning of the bar 88 to its lowermost position by the action of the spring 93. Consequently when the switch 102 is closed, i. e., when a tape is threaded into the mechanism of Figures 10 and 11 between the top of the frame 71 and the tape confining member 75 the tape advancing mechanism will operate continuously and automatically.

An electric typewriter has in addition to the key levers for operating type bars other key levers for effecting return and tabular movements of the carriage. When the mechanism of Figures 10 and 11 is being used for operating a typewriter to make a record from a previously perforated tape the tape will contain perforations for returning the carriage and may contain perforations for effecting tabular movements of the carriage. But the mechanism heretofore described contemplates only continuous advance of the tape so long as the switch 102 remains closed. It will be apparent that advance of the tape must be interrupted when the carriage is being returned or when the carriage partakes of a tabular movement. Mechanism which will now be described is provided for interrupting the feed or advance of the tape when perforations in the tape for causing either a carriage return or a tabular movement of the carriage become effective.

In Figure 6 are shown diagrammatically two key levers 107 and 108 which may be similar to the key lever 2 shown in Figure 1 and provided with masks of the same general character as the mask 32 but each of course distinctive for selective operation of the key lever 107 or 108. When perforations in the tape for actuating either the key lever 107 or the key lever 108 are disposed opposite the contact members 100 the proper solenoids of the series of solenoids 33a–33f operate the bars 36 to permit downward movement of the mask on the carriage return or tab key lever. Taking the key lever 107 as an example, downward movement of that key lever actuates a switch 109 to open a circuit. When the circuit through the switch 109 is closed current flows from the lead 110 through the switch 109, thence through the switch 111 associated with the key lever 108, thence through a lead 112 to an arm 113 pivoted at 114. The arm 113 is disposed in the field of an electromagnet 115 so that when the magnet 115 is energized the arm 113 is drawn toward the left, viewing Figure 6, or in the counterclockwise direction about the axis of the pivot 114. A spring 116 tends to move the arm 113 outwardly, i. e., to turn it in the clockwise direction about the axis of the pivot 114, but when the magnet 115 is energized its force is greater than that of the spring so the arm is drawn in. When the magnet is energized current flows through the lead 112, the arm 113, a contact 117 carried by the arm, a contact 118 carried by the magnet and a lead 119 to the coil of the magnet. From the magnet coil the current flows out to a lead 120, thus completing the circuit to the source of current. When the switch 109 is open the coil of the magnet 115 is de-energized and the arm 113 is by the spring 116 moved toward the right to separate the contacts 117 and 118. Thus, until the coil is again energized the arm 113 will remain in its outer position.

The arm 113 has a contact member 121 connected with a lead 122 leading to the switch 102. The magnet carries a contact member 123 adapted when the arm 113 is in the closed position as shown in Figure 6 to engage the contact member 121 and complete a circuit from the lead 122 through a lead 124 to the lead 110. Thus when the contact members 121 and 123 are in engagement and the switches 102 and 106 are closed the automatic tape feed will operate. When the arm 113 is in its outer position, being limited in its outward movement by a stop 125, the circuit between the leads 122 and 124 is broken and the automatic feed ceases to function.

Figure 7:
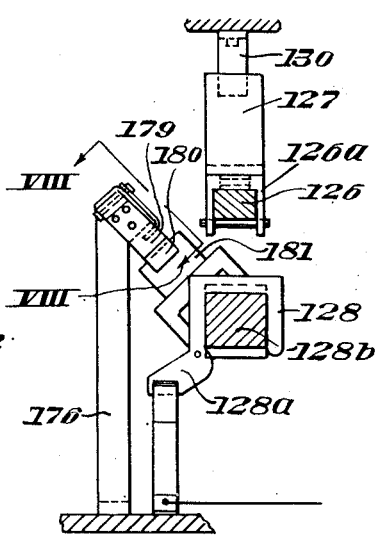
Figure 7 is a vertical cross-sectional view taken on the line VII—VII of Figure 6.

A portion of the typewriter carriage is shown at 126 in Figures 6 and 7. The carriage has a margin stop 126a having a contact member 127 adapted to function as will presently be described to cause the automatic tape feed to resume operation when a carriage return movement is completed. The carriage is also provided with the usual series of tab stops 128 arranged therealong, each of those tab stops having a projection 128a adapted when the tab stop carrying it is in operative position to serve as a contact member as will presently be described to cause the automatic tape feed to resume operation when a tabular movement of the carriage is completed. The tab stops 128 are moved between operative and inoperative positions by being turned upon the bar 128b carrying them as well known in the art. In Figure 7 the tab stop 128 nearest the eye is in operative position and the next tab stop behind is in inoperative position. In Figure 6 the carriage is viewed from the rear. Thus forward movement of the carriage is from left to right in Figure 6 and return movement is from right to left. The carriage is electrically grounded to the typewriter frame as indicated at 129 and 129a which also causes the margin stop 126a with its contact member 127 and the tab stops 128 with their respective projections 128a which constitute contact members to be grounded. Upon completion of a return movement of the carriage the contact member 127 engages a contact member 130 mounted in the typewriter frame but not grounded to the frame. The contact member 130 is connected through a lead 131 to the lead 110. Likewise upon completion of a tabular movement of the carriage toward the right, viewing Figure 6, the contact member 128a engages a contact member 132 mounted in the typewriter frame but not grounded to the frame. The contact member 132 is connected through a lead 133 and the lead 131 to the lead 110. The contact member 132 is flexible so that it will bend over to permit passage of the contact member and tab stop 128 as the carriage continues forward movement toward the right, viewing Figure 6, after completion of one tabular movement. The contact member 132 carries at its right hand face, viewing Figure 6, insulation 134 adapted to be engaged by the member 128 upon a return movement of the carriage from right to left. Thus no circuit is closed between the member 128 and the member 132 upon a return movement of the carriage.

When either the contact members 127 and 130 or the contact members 128 and 132 are in electrical engagement current flows from the lead 110 through the lead 131 and in the case of the contact member 132 also through the lead 133 to the carriage and thence to the ground. But the contact member 118 carried by the magnet 115 is grounded to the typewriter frame by a lead 135. Current passes from the frame through the lead 135 and the contact member 118, the lead 119, the coil and the magnet 115 and the lead 126, thus completing the coil circuit and energizing the coil of the magnet. This draws the arm 113 toward the left, viewing Figure 6, so that the contact members 121 and 123 engage each other to close the circuit for the automatic tape feed which then resumes operation. Also the contact members 117 and 118 enter into engagement with each other so that the coil of electromagnet 115 continues to be energized even after the contact members 127 and 130, or the contact members 128 and 132, are separated.

Extending transversely of the typewriter is a shaft 136 which is journaled in the typewriter frame and is positioned below the front ends of the key levers and spaced a short distance therebelow. The axis of the shaft 136 is perpendicular to the planes of operation of the key levers. The shaft 136 carries a locking bar 137 which when in operative position projects upwardly from the shaft so as to underlie the key levers adjacent their front ends. When the locking bar 137 is in its upright or operative position as shown in Figure 1 it prevents downward movement of the key levers. This in turn prevents recording of a character or a carriage movement (either tabular or return) despite the fact that a tape perforation which would normally bring about such recording or such movement may be passing through the mechanism of Figures 9 and 10 when used to cause a previously cut tape to operate a typewriter to make a record. When the shaft 136 is turned in the clockwise direction, viewing Figure 1 or Figure 13, through an angle of approximately 90° the locking bar 137 is disposed out of the paths of the key levers which may then operate in normal fashion.

When a typewriter is being used for making a record from a previously cut tape it may be desired not to print some of the matter for which perforations have been provided in the tape or not to move the carriage in a return or tabular movement for which perforations have been provided in the tape. In order to avoid printing of such matter or such a movement of the carriage provision is made for rendering operative the locking bar 137 while the perforations in the tape corresponding to the matter to be deleted or to the carriage movement pass the contact members 100 and plate 101. The rendering operative of the locking bar to accomplish the deletions or to prevent the carriage movements above referred to is accomplished by mechanism now to be described.

When the tape is originally cut distinctive perforations are provided in it bracketing the matter which in one form of record subsequently to be made is to be deleted. Similarly perforations in the tape for effecting carriage movements may be bracketed by such distinctive perforations. Those distinctive perforations cause actuation of the mechanism now to be described to render operative the locking bar 137 until the perforations corresponding to the deleted matter or the undesired carriage movements have passed.

When the distinctive perforations in the tape become operative they bring about operation of one or the other of two special keyless levers similar to the key levers above referred to but not having any keys (i. e., levers which are parts of the typewriter structure but which are never manually operated and hence need no keys). These two keyless levers are designated respectively by reference numerals 138a and 139a. (See Figures 16 to 19.) The keyless levers 138a and 139a are respectively effective when operated to release cams 138 and 139 (see Figures 13 and 14), i. e., when the keyless lever 138a is operated it releases the cam 138 and when the keyless lever 139a is operated it releases the cam 139. Mechanism such as that shown in Figure 1 may be employed between the respective keyless levers 138a and 139a and the corresponding cams 138 and 139 so that when, for example, the keyless lever 138 is operated the cam 138a will be released and moved into operative position with respect to the continuously rotating roll 8 which will turn the cam through approximately 180°. When the cam 138 or the cam 139 is thus operated it in turn operates mechanism now to be described.

The cams 138 and 139 are both disposed opposite a cam following roller 140 carried by a pin 141 mounted in a yoke 142 carried on the end of a link 143. The opposite end of the link 143 carries a pin 144 which is disposed in a slot 145 in a disc 146 of generally semi-circular shape as shown in Figure 13. The slot 145 is straight except that its opposed ends 147 and 148 are offset as shown in Figure 13. The disc 146 is fast to the shaft 136. The disc 146 carries a pin 149 to which is connected one end of a tension coil spring 150. The opposite end of the spring 150 is connected with the member 5 at 151. The spring 150 is an over center spring adapted to maintain the disc 146 in either of two positions. The disc is shown in one position against a stop 152a in Figure 13 in which position the locking bar 137 is operative or in the position shown in Figure 1. When the disc 146 is turned through an angle of about 90° in the clockwise direction, viewing Figure 13, it engages a stop 152b and the spring 150 crosses the axis of the shaft 136 and hence maintains the disc resiliently in position against the stop 152b.

The disc 146 is operated by the link 143 which in turn is operated by one or the other of the cams 138 and 139. When the disc is in the position shown in Figure 13 and either of the cams 138 and 139 turns through 180° it engages the roller 140 and pushes the link 143 generally upwardly and toward the left to give the disc 146 an impulse to turn in the clockwise direction. After the spring 150 crosses the axis of the shaft 136 the spring takes control of the disc 146 and completes its rotative movement until it engages the stop 152b. Upon return of the link 143 to its normal position the pin 147 will be disposed in the offset end 148 of the slot 145 in the disc. Upon a subsequent operation of either of the cams 138 and 139 the disc is moved in the counterclockwise direction in a manner analogous to that above described for its clockwise movement and it strikes the stop 152a. Thus each time either of the cams 138 and 139 is operated the locking bar 137 is moved between operative and inoperative positions. If it is initially inoperative it will be rendered operative and if it is initially operative it will be rendered inoperative. Hence one or the other of the cams 138 and 139 will be actuated just before and just after any series of perforations in the tape which are not to become effective pass between the contact members 100 and the contact plate 101. When the locking bar 137 is in its operative position as shown in Figure impulses made by contact of contact members 100 with contact plate 101 cannot result in a printing operation or a carriage movement because the key lever for effecting such printing operation or carriage movement is locked in inoperative position.

The mechanism for making in the tape the special perforations causing operation of the locking bar 137 between operative and inoperative positions will now be described. Referring to Figure 15, the typewriter contains four special key levers 153, 154, 155 and 156 which are effective for actuating selected ones of the solenoids 31a, 31b, 31c, 31d, 31e and 31f to make the special perforations in the tape. However, the key levers 153, 154, 155 and 156 are different from the ordinary key levers of the typewriter in that they are not connected with and do not actuate any type bars; their only function is to operate electrical contacts to energize selected ones of the solenoids 31a, 31b, 31c, 31d, 31e and 31f. The key levers 153 and 154 are shown as actuating through mechanism similar to the mechanism of Figure 1 cams 157 and 158, respectively. These cams cooperate with the power driven roller 8 in the same manner as the cams 15 and all the other similar cams of the typewriter. The cams 157 and 158 are effective when released by operation of the key levers 153 and 154, respectively, to operate levers 159 and 160, respectively, to close circuits through fingers 24' to energize selected ones of the solenoids 31a, 31b, 31c, 31d, 31e and 31f to make the desired special perforations in the tape.

The cams 157 and 158 are similarly mounted, each being pivoted at 157a to the lower extremity of a lever 157b fulcrumed on the rod 10. Each lever 157b normally rests against a fixed stop 157c, the two levers 157b being resiliently urged toward each other and hence toward the respective stops 157c by a tension coil spring 157d. Pivoted to each lever 157b at 157e is a bell crank lever 157f similar in structure and analogous in function to the bell crank levers 19. The levers 157b are analogous to the bell crank levers 11 except that it is not necessary for the levers 157b to have horizontally extending arms analogous to the arms 12 of the bell crank levers 11 because the levers 157d do not actuate any type bars. The means for urging the cams 157 and 158 to turn in the counterclockwise direction, viewing Figure 15, may be the same as the means employed for similarly urging the cams 15 of Figure 1 and the cams 210 of Figure 29. Each of the key levers 153 and 154 has a downward extension 6' having a forked end 7' receiving the upper extremity of the upper arm of the bell crank lever 157f analogously to the structure of Figure 1. Thus when the key lever 153 is depressed the cam 157 is released to operate the lever 159 to make electric contact with the right hand fingers 24', viewing Figure 15, and when the key lever 154 is depressed the cam 158 is released to operate the lever 160 to make electric contact with the left hand fingers 24', viewing that figure. The circuits thus closed cause energizing of particular ones of the solenoids 31a, 31b, 31c, 31d, 31e and 31f to make in the tape the desired special perforations which when the tape is employed for making a record cause operation of one or the other of the keyless levers 138a and 139a to move the locking bar 137 between operative and inoperative positions.

The key levers 155 and 156 function analogously to the key levers 153 and 154, but in the case of each of the key levers 155 and 156, according to the particular arrangement shown in the drawings, there would be only one finger 24' through which current would pass to energize a solenoid; accordingly, since these key levers are not required to operate type bars I can eliminate cams like the cams 157 and 158 and the associated mechanism and can cause the key levers 155 and 156 to operate directly against simple contact members. The key lever 155 when depressed engages a contact member 161 and the key lever 156 when depressed engages a contact member 162. Current passes to the key lever 155 through a lead 163 and passes to the key lever 156 through a lead 164 so that the key levers 155 and 156 themselves act as conductors. Their function is however precisely the same as the function of the key levers 153 and 154, i. e., to cause the making of special perforations in the tape as above explained.

Operation of each of the key levers 153, 154, 155 and 156 causes the making of a particular or distinctive special perforation in the tape. Each perforating operation of one or more of the punches 79 in the manner which has been explained causes the making of one or more round holes arranged in a straight line transversely of the tape. There are six locations transversely of the tape at which a hole may be made in it upon each perforating operation. Thus by varying the number of holes punched in a perforating operation and varying the arrangement of the holes across the tape a large number of permutations and combinations may be obtained.

For purposes of explanation and illustration the special perforations made by the key levers 153, 154, 155 and 156 will be designated by Roman numerals as follows:

Key lever 155— I
Key lever 153— II
Key lever 156—III
Key lever 154—IV

It has been explained that any matter corresponding to perforations which pass between the contact members 100 and the contact plate 101 when the locking bar 137 is in operative position as shown in Figure 1 is deleted. It has also been explained that movement of the locking bar between operative and inoperative positions is effected by operation of one or the other of the cams 138 and 139. It has further been explained that the cam 138 is released by operation of a keyless lever 138a and the cam 139 is released by operation of a keyless lever 139a. Each of the keyless levers 138a and 139a has a slot 165 adapted to receive the locking bar 137 when the locking bar is in operative position and the lever is operated since it is necessary that the levers 138a and 139a be operable at all times, whether or not the locking bar 137 is in operative position.

Provision is made for operation of the keyless levers 138a and 139a by the special perforations above referred to which are made by operation of the key levers 153, 154, 155 and 156. The keyless lever 138a is provided with a special mask designated generally by reference numeral 138b and the keyless lever 139a is provided with a special mask designated generally by reference numeral 139b. The masks 138b and 139b are generally similar to the masks 32 above described except that each of the masks 138b and 139b has a shiftable lower portion, the shiftable lower portion of the mask 138b being designated 138c and the shiftable lower portion of the mask 139b being designated 139c. Since the masks 138b and 139b are structurally similar description of one will suffice for both.

The upper portion of the mask 138b has therein a headed pin 166 which passes through a lever 167. The lower end of the lever 167 is pivotally connected with the mask portion 138c by a headed pin 168. Hence it will be seen that by shifting the lever 167 the mask portion 138c can be made to assume two adjusted positions with respect to the upper portion of the mask, those adjusted positions being shown respectively in Figures 16 and 17. Tension coil springs 169 are connected with the upper and lower portions of the mask as shown in Figures 16 and 17 and yieldably urge the upper and lower portions of the mask together. Since the lever 167 is disposed at an angle to the line of juncture between the upper and lower portions of the mask in each of its two positions the springs 169 act as over center springs and insure maintenance of the mask portion 138c in each of its two adjusted positions. The mask portion 138c is provided with an upwardly projecting rib 138d adapted when the mask portions are in one of their relative positions to enter a groove 138e in the upper mask portion and when the mask portions are in the other of their relative positions to enter a groove 138f in the upper mask portion. This rib and groove construction insures accurate positioning of the mask portion 138c relative to the upper portion of the mask in either of the two positions shown in Figures 16 and 17.

Each of the mask portions 138c and 139c moves, when it is shifted from one position to the other, through a distance equal to one-half the distance between the axes of two adjacent bars 36 as shown in Figures 16, 17, 18 and 19. This shifting causes each of the masks 138b and 139b to be selectively responsive to two perforations in the tape. When the mask portion 138c is in the position of Figure 16 it is responsive to perforation I; when the mask portion 138c is in the position of Figure 17 it is responsive to perforation II; when the mask portion 139c is in the position of Figure 19 it is responsive to perforation III; and when the mask portion 139c is in the position of Figure 18 it is responsive to perforation IV.

The reason for having two cams 138 and 139 for operating the mechanism of Figure 13 and for having special adjustable masks for the keyless levers 138a and 139a whose function is to release those cams is to provide for selectively deleting particular matter on different records made from the same tape so that such matter may be recorded on a predetermined record or records and deleted on a predetermined record or records. One of the features of my method and apparatus is that a plurality of records may be made with but a single inditing and selected portions of the indited matter may be predeterminedly recorded or not recorded on each record. When my mechanism of Figures 1–28 is used for cutting a tape and that tape is subsequently used for making more than one additional record different from the original record and also different from the first additional record it is necessary to have a plurality of special deleting perforations and means responsive to those perforations in such a way that particular matter can be deleted on any one or more of the records made by use of the tape. For example, if three records in addition to the original record are to be made the tape is utilized three successive times in the making of those three additional records. With respect to those three additional records seven possibilities exist as to the recording or not recording of particular matter thereon. It may be desired to delete particular matter in the first record only, in the second record only, in the third record only, in the first and second records, in the second and third records, in the first and third records or in the first, second and third records. The mechanism of Figures 13, 14 and 16 to 20, inclusive, accomplishes the deletion of particular material in any one or more of the records being made from a tape when operated, as will now be described.

When a previously cut tape is to be used for making successive different records the difference in the records is brought about by differences in the positions of the mask portions 138c and 139c. For example, for making the first record from the tape the mask portion 138c may be disposed in the position of Figure 16 and the mask portion 139c may be disposed in the position of Figure 19; for making the second record from the tape the mask portion 138c may be disposed in the position of Figure 17 and the mask portion 139c may be disposed in the position of Figure 19; and for making the third record from the tape the mask portion 138c may be disposed in the position of Figure 17 and the mask portion 139c may be disposed in the position of Figure 18. The following table shows the effect of the special perforations which we have referred to above as I, II, III and IV which are made in the tape respectively through operation of the key levers 155, 153, 156 and 154 when those perforations are employed for bracketing perforations in the tape corresponding to particular material to be selectively deleted. It is to be understood that the mask portion 138c when in the position of Figure 16 is responsive to special perforation I; that the mask portion 138c when in the position of Figure 17 is responsive to special perforation II; that the mask portion 139c when in the position of Figure 19 is responsive to special perforation III; and that the mask portion 139c when in the position of Figure 18 is responsive to special perforation IV. In the table the Roman numerals in brackets under the respective headings "1st record," "2nd record" and "3rd record" indicate the special perforations to which the respective mask portions 138c and 139c are set to be responsive during the making of that record.

| Matter Bracketed By | 1st Record [I] [III] | 2nd Record [II] [III] | 3rd Record [II] [IV] |
| --- | --- | --- | --- |
| I | Delete | Print | Print. |
| II | Print | Delete | Delete. |
| III | Delete | ...do | Print. |
| IV | Print | Print | Delete. |
| I II | Delete | Delete | Do. |
| II IV | Print | ...do | Print. |
| I IV | Delete | Print | Delete. |

To illustrate, matter which is to be deleted in the first record but printed in the second and third records is bracketed with special perforation I. When that perforation becomes effective in making the first record it results in operation of the keyless lever 138a since when the first record is being made the mask portion 138c is in the position of Figure 16 and is responsive to special perforation I. Operation of the keyless lever 138a causes operation of the cam 138 and movement of the locking bar 137 to operative position. The locking bar remains operative until the second special perforation I becomes effective when the locking bar is moved back again to inoperative position. The special perforations I have no effect when the second and third records are being made since at that time the mask portion 138c is not in the position of Figure 16 but is in the position of Figure 17, in which position it is responsive to special perforation II and not to special perforation I.

Similarly, matter which is to be deleted in the second and third records but printed in the first record is bracketed with special perforation II. Special perforation II has no effect when the first record is being printed but when the second and third are being printed is responded to by operation of the keyless lever 138a since at those times the mask portion 138c is in the position of Figure 17 and hence responsive to special perforation II. When it is desired to print certain matter only on the third record and not on the first and second records special perforation III is employed; and when it is desired to print matter on the first and second records and not on the third record special perforation IV is employed.

When it is desired to delete on all of the first, second and third records matter represented by perforations in the tape that matter is bracketed by special perforations I and II cut in the tape together both before and after it. When the first record is being printed special perforation I brings about movement of the locking bar to operative position and special perforation II has no effect, while when the second and third records are being printed special perforation I has no effect and special perforation II brings about movement of the locking bar to operative position.

When it is desired to print matter on the first and third records but to delete it on the second record that matter is bracketed by the special perforation II and IV cut in the tape together both before and after it. When the first record is being printed neither of special perforations II and IV will be effective so the matter will print. When the second record is being made special perforation II will result in movement of the locking bar to operative position. When the third record is being printed both of the special perforations II and IV will be effective both before and after the matter in question, resulting in a double operation of the disc 146 both before and after such matter. That double operation results in movement of the locking bar to operative position for an instant and then immediately movement of it back to inoperative position, the net result being the same as if the locking bar had not been moved at all.

When it is desired to print matter on the second record only and to delete it on the first and third records the special perforations I and IV are cut in the tape together both before and after it. Special perforation I is effective for deleting the matter in the first record and special perforation IV is effective for deleting it in the third record. Neither of special perforations I and IV is effective when the second record is being printed so the matter in question will be printed in that record.

It is possible with the mechanism disclosed to provide for the printing of still a fourth record from the same tape so that any matter on the tape may as desired be printed or not printed on that record. In that case the mask portion 138c is disposed in the position of Figure 16 and the mask portion 139c is disposed in the position of Figure 18.

It will seldom if ever be desired to make even as many as three records from a single tape using all the permutations and combinations exemplified in the table. Ordinarily by proper setting of the mask portions 138c and 139c it will not be necessary to bracket any matter represented by perforations in the tape by more than one of the special perforations.

The selectivity obtained by use of the special perforations made by operation of the key levers 153, 154, 155 and 156 applies not only to the recording and deleting of characters but also to effecting or not effecting carriage movements at desired intervals. The above detailed description has been with relation to the recording or deleting of characters simply by way of illustration. The effecting or not effecting of carriage movements might just as well have been selected for illustration. The carriage return and tabular movements are effected through the use of masks of the general structure of the masks 32 and the carriage movements are hence controlled by perforations in the tape which allow operation of those masks. Operation of the masks for effecting carriage return and tabular movements can be prevented by movement of the locking bar 137 to operative position when the perforations in the tape corresponding to carriage movements pass between the contact members 100 and the contact plate 101.

Thus by proper utilization of the key levers 153, 154, 155 and 156 provision may be made for making from a single tape a plurality of different records which differ from one another in various respects. The records may differ from one another in that one or more of them may contain matter not contained in others. They may differ in the spacing of matter which is recorded, the spacing being controlled by tabular movements of the carriage. The records may differ in that in one record particular matter may be printed on the same line with other material while in another record it may be printed on a different line. Thus records may be made on record sheets of different sizes.

Still further variations may be obtained by differently setting the tab stops of the typewriter upon the making of different records from the same tape. Likewise perforated sheets may be used and portions of a record printed on opposite sides of a perforation, whereafter the sheet may be torn along the perforation. Still further, the pawl for turning the typewriter carriage roller to advance the record sheet upon a carriage return movement may be set to turn the carriage through different increments of angular movement upon each carriage return during the making of successive records from the same tape. A great variety of different records and arrangements is thus provided for.

It is possible to place in the tape perforations for the printing in subsequent records of matter which does not appear in the original record which is made simultaneously with the cutting of the tape. This is done by manually moving the type writer carriage during cutting of those perforations to a position such that the matter in question is not printed on the record sheet in the typewriter. Such matter may be printed off to the side or on a special portion of the sheet adapted to be torn off and discarded and indeed adapted to itself constitute a separate record.

When making an original record on the typewriter and at the same time cutting a tape operation of the normal controls on the typewriter for effecting tabular and return movements of the carriage cause making in the tape of special perforations for causing carriage return and tabular movements in records made by use of the tape. However, I provide in the typewriter two additional key levers similar to the key levers 155 and 156 for forming in the tape perforations for carriage tabular and return movements respectively without any effect upon the typewriter at the time the tape is being cut and hence which are not effective in the making of the original record which is made simultaneously with cutting the tape. Therefore it is possible to provide in the tape perforations which in the making of subsequent records will bring about tabular and return movements of the carriage without effecting such movements of the carriage in the making of the original record which is made simultaneously with cutting of the tape.

When a columnar record is to be made having columns between which the carriage partakes of tabular movements and when the material to be columnized in that record is less than all of the material represented by perforations in the tape it may be desirable to provide the typewriter with special means for recording the desired matter in columnar arrangement and deleting the undesired matter, making unnecessary the utilization of delete perforations in the tape as above explained. For example, if a tape contains a complete record of a series of transactions it may be desired to columnize selected material on ledger sheets with the material pertaining to each transaction appearing on a single line on the ledger sheet, but which material constitutes only a selected portion of all the material on the tape pertaining to that transaction. The selected material will be arranged on the ledger sheet in columns with comparable items collected in the same column. The tape may contain delete perforations as to some of the material; when the special provision is made for columnizing the selected material as just mentioned the delete perforations in the tape will be rendered ineffective and the desired deletions will be effected by the special provisions in the type writer now to be described.

The pin 141 carrying the roller 140 (see Figures 13 and 14) is carried upon the upper end of a lever 170 pivoted at 171 to the frame. The lever 170 carries a core 172 and is normally urged to turn in the clockwise direction about the axis of the pivot 171, viewing Figure 13, by the spring 150. Mounted in the frame on a bracket 174 is a solenoid 175 adapted when energized to draw the core 172 toward the left, viewing Figure 13, and hence operate the locking bar 137. The solenoid 175 thus constitutes a device for operating the locking bar which may be used instead of the cams 138 and 139. The cams 138 and 139 operate the locking bar in response to delete perforations in the tape. The solenoid 175 is rendered effective by means now to be described for operating the locking bar upon tabular movements of the carriage.

Figure 8:
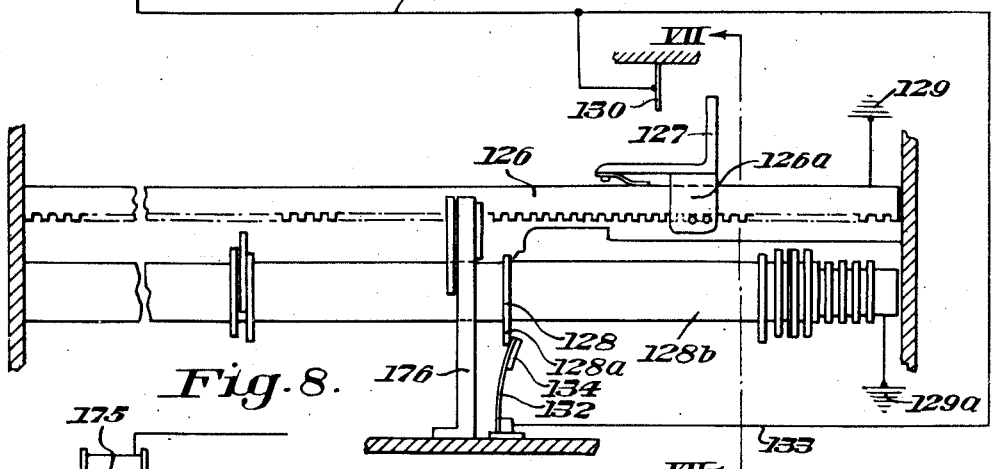
Figure 8 is a view consisting in part of a cross-sectional view taken on the line VIII—VIII of Figure 7 and in part of a diagram showing electrical connections operated thereby.

Mounted in the typewriter frame is a bracket 176 (see Figures 6 and 8). The bracket 176 carries a switch 178. The switch comprises two arms 179 and 180. The arm 179 is rigidly attached to the bracket 176. The arm 180 is flexible and also is pivotally attached to the bracket by a pivot 177. A spring 173 biased between the bracket 176 and the arm 180 urges the arm 180 in the clockwise direction, viewing Figure 8, about the axis of the pivot 177 toward the arm 179. However, the spring 173 does not move the arm 180 all the way into contact with the arm 179 but simply holds it resiliently against the face of the bracket 176 opposite that at which the arm 179 is attached. Thus normally the arms 179 and 180 are in the relative positions shown by solid lines in Figure 8, but the arm 180 by reason of its flexibility is capable of being flexed into the dotted line position of Figure 8 into contact with the arm 179 and also by reason of being pivoted to the bracket 176 and urged toward the bracket by the spring 173 is capable of being pushed back about the axis of the pivot 177 away from the bracket against the action of the spring. The arms 179 and 180 project from the top of the bracket 176 downwardly and inwardly toward the carriage at an angle of approximately 45° as shown in Figure 7. The arm 180 is somewhat longer than the arm 179.

Means are provided on the carriage for momentarily closing the switch 178 during movement of the carriage 126 in a tabular movement. This is done when it is desired to delete or not print material represented by perforations in the tape being used for making the record, which perforations are between the perforation bringing about that tabular movement and the next perforation in the tape bringing about a tabular movement. There are provided switch operating members 181 which are in the nature of separate devices adapted to be attached to the bar 128b upon which the tab stops 128 are mounted. One of the members 181 is positioned on the bar 128b so that it engages the switch 178 to close that switch during a tabular movement when the material represented by perforations in the tape between the perforation for that tabular movement and the perforation for the succeeding tabular movement is not to be printed. The member 181 on a tabular movement moves downward relatively to the switch 178, viewing Figure 8. It engages the relatively long flexible arm 180 of the switch and causes that arm to bend over and make contact with the arm 179 as indicated in dotted lines in Figure 8, thus closing the switch. As the member 181 moves past the switch the arm 180 snaps back into its normal position as shown in solid lines in Figure 8, opening the switch. On a return movement of the carriage the member 181 engages the arm 180 of the switch but such engagement does not result in closing of the switch; it simply moves the arm 180 about the axis of the pivot 177 and against the action of the spring 177a in the counterclockwise direction about the axis of the pivot 177, viewing Figure 8. After the member 181 parts contact with the arm 180 the spring 173 returns the arm to its normal position.

Referring now to Figures 22 and 23, it will be seen that the keyless levers 138a and 139a for operating respectively the cams 138 and 139 for in turn operating the locking bar 137 are spaced apart so that one of the levers 2 is disposed therebetween. This is because alternate levers along the keyboard, whether they be key levers or keyless levers, cooperate respectively with cams on opposite sides of the roller 8. Since it is essential that the levers 138a and 139a both cooperate with cams on the same side of the roller 8 those levers are spaced apart so that one lever is positioned therebetween which cooperates with a cam on the opposite side of the roller.

When the mechanism including the solenoid 175 is to be used for controlling the locking bar 137 the levers 138a and 139a should be locked so that any perforations in the tape normally effective for operating the levers 138a and 139a will be rendered ineffective, while the mechanism including the solenoid 175 is effective. For locking the levers 138a and 139a there is attached to the member 5 by a bolt 182 a bracket 183 pivotally carrying at 184 a lever 185 whose upper portion forms a handle member and whose lower portion is divided to form a yoke 186 having downwardly projecting arms 187 each having a horizontally projecting foot 188, the respective feet 188 extending from the arms 187 in opposite directions. Each of the feet 188 is provided with a roller 188a. The respective feet 188 are adapted when the lever 185 is rendered operative to underlie the respective levers 138a and 139a. The lever 185 is rendered operative by turning it in the clockwise direction about the axis of the pivot 184, viewing Figure 22, until the rollers 188a engage the under surfaces of the levers 138a and 139a. In this way the levers 138a and 139a are locked in inoperative position. The lever 185 is moved to position to thus lock the levers 138a and 139a when the mechanism including the solenoid 175 is to be employed for operating the locking bar 137.

Perforations in the tape for causing a tabular movement of the carriage result when disposed between the contact members 100 and the contact plate 101 in the sending of electrical impulses to four of the six solenoids 33a, 33b, 33c, 33d, 33e and 33f. Those four particular solenoids are at no other time simultaneously actuated. Actuation of those solenoids causes angular movement of the corresponding four of the levers 34. Four switches 189 are provided which are closed by movement of those four levers 34 in response to the action of the solenoids. The four switches 189 are mounted on the typewriter frame and have contacts engageable by the four levers 34 referred to. Thus when perforations in the tape intended for effecting a tabular movement in the carriage become effective between the contact members 100 and the contact plate 101 all four of the switches 189 are simultaneously closed.

The four switches 189 are connected in series as shown in Figure 21 and are also in series with another switch 190 adapted to be operated by a disc 146a similar to the disc 146 and also fast on the shaft 136. The disc 146a is thus in effect integral with the disc 146 and partakes of the same movements; or, if desired, the discs 146a may be the same disc as the disc 146. Also in series with the four switches 189 and the switch 190 are the solenoid 175 and a manually operable switch 191 which is adapted to be closed at the same time as the lever 185 is moved to operative position to lock the levers 138a and 139a. The switch 191 may be arranged to be automatically closed by the lever 185 when that lever is moved to operative position.

In Figure 21 the disc 146a is shown in the position it occupies when the locking bar 137 is in operative position. When the disc 146a is in that position the switch 190 is held closed thereby. A lead 192 extends from the switch 178 to a lead 193 which extends from the switch 190 to the solenoid 175. A lead 194 extends from the other side of the switch 178 to a lead 195 in circuit between the switches 189 and the switch 191.

When it is desired to form a columnar record from a tape and at the same time to delete certain matter represented by perforations in the tape disposed between perforations therein for causing tabular movements of the carriage the lever 185 is moved to operative position to lock the levers 138a and 139a, the manual switch 191 is closed and switch operating members 181 are applied to the bar 128b so that each of them will close the switch 178 during each tabular movement of the carriage which is caused by a perforation in the tape immediately preceding perforations in the tape representing material which it is desired to delete.

A two-position mask similar to the masks 138b and 139b is provided on the carriage return key lever so that carriage return movements can be effected selectively by two different perforations in the tape. The mask will be disposed in one position when the normal carriage return perforations are to be operative and will be disposed in the other position when the normal carriage return perforations are to be inoperative, carriage return movements then being effected only by special carriage return perforations which are predeterminedly punched in the tape so that the carriage will return and print successive records in columnar arrangement.

When on a tabular movement of the carriage the switch 178 is closed the solenoid 175 is energized, resulting in movement of the locking bar 137 to closed position. The effect of moving the locking bar to closed position is that all perforations in the tape prior to the next perforation for causing a tabular movement of the carriage will be ineffective and the matter represented by those perforations will be deleted. When the locking bar 137 is in operative position the disc 146a is in the position shown in Figure 21 holding the switch 190 closed. The next perforation in the tape for causing a tabular movement of the carriage results in closing of the switches 189 and passing of an impulse through the closed switch 191, the lead 195, the closed switches 189, the closed switch 190 and the solenoid 175, which in turn results in movement of the locking bar to inoperative position, thus permitting subsequent perforations in the tape to become effective. Upon movement of the locking bar to inoperative position the disc 146a moves away from the switch 190 which is thereupon moved to open position by spring means therein.

Figures 24 and 25 show a modified construction for the central portion of the mechanism shown in Figures 10 and 11 which provides for correcting errors made in the tape during cutting thereof. The structure of Figures 10 and 11 is adapted for advancing the tape in one direction only, i. e., from right to left, above the frame 71 and from left to right below that frame. The modified construction of Figures 24 and 25 allows the tape to be reversed for the correction of errors. The ratchet 74 of Figures 10 and 11 is replaced by a ratchet 74' which has symmetrical V-shaped teeth so that it may be pawl-operated in either direction. The escapement 90 of Figures 10 and 11 is eliminated and the bar %88 is extended to the right beyond the shaft 72 and beyond the ratchet 74' where it is provided with a pawl 89a. The pawl 89 of Figures 10 and 11 is replaced by a pawl 89'. In the structure of Figures 24 and 25 the pawls 89' and 89a are adapted to be rendered selectively operable for turning the ratchet 74'. The shaft 72 is extended beyond the frame where it is provided with a knob 72' by which it may be turned. The toothed wheel 73 and the ratchet 74' are rigidly connected together to turn as a unit but are freely rotatable upon the shaft 72. Fixed to the shaft 72 is a lever 73' the respective ends of which project in opposite directions from the axis of the shaft 72. Springs 75' extend between the respective ends of the lever 73' and the respective pawls 89' and 89a, the construction and arrangement of the springs being such that when the lever is in the position shown in Figure 24 the pawl 89a is operative with respect to the ratchet 74' while the pawl 89' is inoperative. If the shaft 72 is turned through an angle of approximately 90° in the clockwise direction, viewing Figure 24, the pawl 89' is by its spring 75' drawn inwardly into operative position and the pawl 89a is by its spring 75' pushed out to inoperative position. The shaft 72 is turned by the knob 72', which is simply a control determining which of the pawls 89' and 89a is to be operative.

When the pawl 89' is operative the toothed wheel 73 is advanced a step in the counterclockwise direction, viewing Figure 24, upon each cycle of angular movement of the bar 80. This is its normal operation. When, however, an error is made in perforating the tape the shaft 72 is by the knob 72' turned through an angle of approximately 90° in the counterclockwise direction, viewing Figure 24, to render the pawl 89' inoperative and the pawl 89a operative, as shown in Figure 24. When the pawls are in that position the ratchet 74' and the toothed wheel 73 are turned backward, i. e., in the clockwise direction, viewing Figure 24, upon angular movement of the bar 88. When an error has been made in perforating the tape the pawl 89a is rendered operative as above explained and an error key which when operated energizes all six of the solenoids 31a, 31b, 31c, 31d, 31e and 31f is operated to punch six holes in the tape at each erroneous perforation. Each time the error key is operated the tape will move one step in the reverse direction. Operation of the error key is continued until all of the errors have been nullified, whereupon the pawl 89' is rendered operative and the pawl 89a is rendered inoperative and any key is operated to advance the tape through the cancelled perforations, whereupon cutting of the tape may continue. When the tape is later used for the making of a record the six holes cut in it by use of the error key will cause nothing to print. Movement of the ratchet 74' is controlled by a spring pressed ball 71' engaging the ratchet teeth as shown in Figure 24.

Figures 26 and 27 show mechanism for controlling the recording of selected material from an indited record by the employment of perforations in the tape for effecting carriage movements. The mechanism of Figures 26 and 27 contains the same mechanism as is shown in Figure 21 and also contains other mechanism which may be used alternatively to all other delete control mechanisms heretofore described. The showing of Figures 26 and 27 is of both alternative forms with a selector switch whereby either may be rendered operative and the other inoperative. In an actual machine structure either the mechanism now to be described or, alternatively, all the delete control mechanisms heretofore described may be employed. The perforations in the tape for effecting the carriage movements are utilized as the controls for actuating the mechanism.

In Figure 26 elements designated by reference numerals 136, 146a, 175, 178, 179, 180, 189 and 190 are the same as the corresponding elements of Figure 21. The single throw manually operable switch 191 of Figure 21 is replaced by a double throw switch 191a in Figure 26. The switch 191a has two blades 240 and 241 respectively. The blades are connected by a link 242 to operate in unison. The upper terminals of the blades are pivoted respectively at 243 and 244. The pivot 243 is electrically connected with the solenoid 175 by a lead 245. The pivot 244 is connected by a lead 246 with the four switches 189 in series. A lead 247 extends from the series of switches 189 to the source of current at 248. The lower end of the switch blade 240, viewing Figure 26, is adapted selectively to contact terminals 249 and 250 while the lower end of the switch blade 241 is adapted selectively to contact terminals 251 and 252. The switch has an open position in which the lower extremity of the blade 240 lies midway between the terminals 249 and 250 and out of contact with both and the lower extremity of the blade 241 lies midway between the terminals 251 and 252 and out of contact with both. The switch may be operated by a suitable handle which is not shown in the drawings since the latter are diagrammatic. The switch operates so that when one blade is in open position the other blade must likewise be in open position and so that when the blade 240 is in contact with the terminal 249 the blade 241 is in contact with the terminal 251 and when the blade 240 is in contact with the terminal 250 the blade 241 is in contact with the terminal 252.

When the switch 191a is in the position shown in Figure 26 with the blade 240 in contact with the terminal 249 and the blade 241 in contact with the terminal 251 the mechanism operates in precisely the same way as the mechanism of Figure 21. With the switch 190 open, when the switch 178 is closed current flows from the current source 248 through a lead 255 to the switch 178 and thence through a lead 256, the terminal 249, the blade 240, the pivot terminal 243, the lead 245, the solenoid 175 and a lead 254 to the current source at 253. Operation of the solenoid 175 causes operation of the disc 146a to close the switch 190. When thereafter the switches 189 are closed current flows from the current source at 248 through the lead 255, the lead 247, the switches 189, the lead 246, the pivot terminal 244, the blade 241, the terminal 251, a lead 257, the switch 190, a lead 258, the terminal 249, the blade 240, the pivot terminal 243, the lead 245, the solenoid 175 and the lead 254 to the source of current at 253. This causes operation of the solenoid 175 to turn the disc 146a to open the switch 190 and thereby complete the cycle. When the disc 146a is in the position shown to close the switch 190 the locking bar 137 is in operative position and prevents recording of matter represented by perforations in the tape passing between the contact members 100 and the contact plate 101. In other words, when the switch 191a is in the position shown in Figure 26, the mechanism of that figure functions in exactly the same way as the mechanism of Figure 21.

Mounted in the frame is a shaft 259 upon which is mounted for rotation a drum 260 and a ratchet 261. The drum 260 and ratchet 261 are integral and always turn together. The drum is adapted to be driven through the ratchet by means now to be described.

Pivoted to the shaft 259 is a bar 262 which extends to the left, viewing Figures 26 and 27. Pivoted to the bar 262 at 263 is a pawl 264 meshing with the ratchet 261. The pawl is maintained at all times in engagement with the ratchet by a spring 265. A spring-pressed ball 266 controls the ratchet similarly to the spring-pressed ball 71' of Figure 24. The spring-pressed ball holds the ratchet against retrograde movement during turning of the bar 262 in the clockwise direction about the axis of the shaft 259. When the bar 262 turns in the counterclockwise direction the pawl 264 engages the ratchet 261 to turn it and the drum 260 one step in the counterclockwise direction, viewing Figure 26. When the bar 262 moves in the clockwise direction the pawl 264 rides over the ratchet teeth and does not move the ratchet or drum.

The drum 260 has a plurality of series of drilled holes 267 in its surface as shown in Figure 27. Each series of holes 267 extends circumferentially of the drum and the various series are therefore spaced apart axially of the drum. Each hole 267 is adapted to receive either a long or a short pin. The pins are to control the printing or deleting of matter represented by perforations in the tape between perforations for tabular movements of the carriage. The pins in the respective circumferential series of holes 267 are for controlling the printing or deleting of selected matter upon successive cycles of operation of the tape, i. e., the pins in one circumferential series of holes are adapted to be rendered operative upon one cycle of operation of the tape, those in another circumferential series of holes upon another cycle of operation of the tape, etc. By differently arranging the long and short pins in the holes different matter will be deleted or printed in records made upon the respective cycles of operation of the tape.

Adapted to cooperate with pins disposed in the holes 267 is a detent 268. The detent 268 is a rigid member projecting radially from a collar 269 slidably mounted on a rod 270 mounted in spaced apart plates 271 and 272 fixedly disposed in the frame. Connected with the collar 269 is an operating rod 273 having a handle 274 projecting through the plate 272. The collar 269 is adapted for both turning movement upon the rod 270 and longitudinal movement on that rod. The purpose of the operating rod 273 is to move the collar 269 longitudinally of the rod 270. The operating rod 273 does not interfere with turning of the collar 269 on the rod 270 since the opening in the plate 272 through which the operating rod 273 passes is shaped to permit movement of the operating rod 273 with the collar 269 when the collar turns on the rod 270. A spring 275 is mounted upon the rod 270 and bears against the detent 268 to urge the detent to turn in the counterclockwise direction about the axis of the rod 270, viewing Figure 26. The rod 270 has spaced therealong transverse grooves 276 each in the plane of one of the series of holes 267 in the drum 260. The collar 269 has a small spring adapted to snap into the various grooves 276 as the collar is moved longitudinally of the rod 270 by the operating rod 273. Thus the collar 269 may by operation of the rod 273 be positioned opposite a desired series of holes 267 in the drum 260 so that it will remain in that axial position on the rod 270 but may by operation of the operating rod 273 be easily moved to a position in the plane of another series of holes 267.

The collar 269 carries a flexible contact member 277 which projects generally horizontally therefrom toward the right as shown in Figures 26 and 27. Two contact rods 279 and 280 are carried by the plates 271 and 272 but are electrically insulated therefrom. The contact member 277 projects between the contact rods 279 and 280 as shown in Figure 26. The spring 275 as above mentioned urges the collar 269 to turn in the counterclockwise direction about the axis of the rod 270. Movement of the collar in the counterclockwise direction is limited by contact of the contact member 277 with the contact rod 279.

The contact member 277 is electrically connected with the lead 255 by a lead 282. The contact rod 279 is electrically connected by a lead 283 with a lead 284 which in turn is electrically connected with the switch terminal 252. A lead 285 electrically connects the contact rod 280 with the switch terminal 250.

The bar 262 carries adjacent its left hand end, viewing Figure 26, a core 286 disposed in the field of a solenoid 287. Disposed beneath the bar 262 is a fixed contact member 288 which is connected by a lead 289 with the lead 284. Connected with the solenoid 287 by a lead 290 is a movable contact member 291 having its free end disposed above the fixed contact member 288 and which is adapted to be brought into engagement with the fixed contact member when the left hand end of the bar 262 viewing Figure 26 moves downwardly. A tension coil spring 292 biased between the bar 262 and the frame resiliently urges the left hand end of the bar 262, viewing Figure 26, downwardly so that normally the movable contact member is held in contact with the fixed contact member 288. However, when the left hand end of the bar 262 moves upwardly the free end of the contact member 291 springs away from the fixed contact member 288. A lead 293 extends from the solenoid 287 to the lead 254 and the source of current at 253.

During operation of the mechanism the drum 260 is adapted to turn in the counterclockwise direction, viewing Figure 26. The holes 267 in the drum are drilled at an angle to the radial direction so that the pins which are disposed in those holes project outwardly from the drum in a direction approaching tangential as shown in Figure 26. Two lots of pins are provided, long pins 294 and short pins 295. Each long pin 294 is of such length that when it engages the detent 268 as the drum 260 revolves it causes the contact member 277 to break contact with the contact rod 279 and engage the contact rod 280 while each short pin 295 is of such length that when it engages the detent 268 as the drum 260 revolves it does not cause the contact member 277 to engage the contact rod 280 but merely causes the contact member 277 to break contact with the contact rod 279. When no pin is in engagement with the detent 268 the spring 275 maintains the contact member 277 against the contact rod 279.

The number of pins inserted into holes 267 of a circumferential series of such holes in the drum 260 will be equal to the number of perforations in the tape for effecting tabular movements of the carriage. As will be explained, the apparatus of Figures 26 and 27 is responsive to each such perforation in the tape, but the nature of the response is determined by whether a corresponding pin in the drum 260 is a long pin or a short pin. When a long pin is positioned in the drum corresponding to a tabular perforation in the tape the locking bar 137 is moved to operative position until the next tabular perforation becomes effective which has a corresponding long pin in the drum.

For example, let it be supposed that a given tape contains sixteen tabular perforations so that a record made by it if none of the matter is deleted will contain sixteen items arranged in tabular form, the number of rows and columns depending upon the number and arrangement of carriage return perforations and tabular movement perforations in the tape. Let it be supposed that the material without any deletions would be printed in four columns, four items in each column. Then let it be supposed that it is desired to make a record consisting of only the first and fourth columns. This means that the material of the second and third columns must be deleted. The result is achieved by positioning in the drum sixteen pins, eight long and eight short, arranged alternately as shown in Figure 26. Since the matter in the first column is to be printed the pins are arranged so that a long pin becomes effective in relation to the first tabular perforation in the tape, a short pin in relation to the second, a long pin in relation to the third, etc.

It is to be understood that the drum 260 is only effective when the switch blade 240 is in contact with the terminal 250 and the switch blade 241 is in contact with the terminal 251. The switch is moved to that position and the pins are positioned in one of the series of holes 267 in the drum 260 so that a long pin is in engagement with the detent 268 as shown in Figure 26. When the first tabular perforation in the tape comes between the contact members 100 and the contact plate 101 the switches 189 are closed through movement of the solenoid-core-bearing levers. This causes current to flow from the current source at 248 through the lead 255, the lead 247, the closed switches 189, the lead 246, the switch blade 241, the lead 284, the lead 289, the contact member 288, the contact member 291, the lead 290, the solenoid 287 and the lead 293 to the current source at 253. The result is energizing of the solenoid 287 which draws the core 286 upwardly and causes the bar 262 to turn in the clockwise direction about the axis of the shaft 259, the pawl 264 riding freely over the ratchet 261. When the left hand end of the bar 262, viewing Figure 26, rises in response to the action of the solenoid the contact member 291 parts contact with the contact member 288 and the circuit through the solenoid is broken, whereupon the spring 292 draws the left hand end of the bar 262 downwardly, causing the pawl 264 to advance the ratchet 261 and the drum 260 one step in the counterclockwise direction, viewing Figure 26. The long pin which is in engagement with the detent 268 causes engagement of the contact member 277 with the contact rod 280. This causes current to flow from the current source at 253 through the lead 254, the solenoid 175, the lead 245, the switch blade 240, the lead 285, the contact member 277, the lead 282 and the lead 255 to the current source at 248. This energizes the solenoid 175 which causes movement of the locking bar 137 to operative position. The long pin passes out of contact with the detent 268, whereupon the spring 275 turns the collar 269 to bring the contact member 277 into contact with the contact rod 279. This causes current to flow from the current source at 248 through the lead 255, the lead 282, the contact member 277, the contact rod 279, the lead 283, the lead 289, the contact member 288, the contact member 291, the lead 290, the solenoid 287 and the lead 293 to the current source at 253. This in turn causes energizing of the solenoid 287 and advancing of the drum 260 one step as above described. However, as long as the contact member 277 remains in contact with the contact rod 279 the circuit through the solenoid 287 will act as a buzzer circuit, the solenoid being repeatedly energized and de-energized causing step by step turning of the drum 260 in the counterclockwise direction, viewing Figure 26. This continues until the next pin engages the detent 268 to move the contact member 277 away from the contact rod 279. Thereupon the drum stops and remains stationary until the next tabular perforation in the tape comes between the contact members 100 and the contact plate 101, whereby the switches 189 are again closed. For every long pin in the drum in engagement with the detent 268 the operation will be as described above, the solenoid 175 being energized to move the locking bar 137 to the opposite position, i. e., to render it operative if it is already inoperative or to render it inoperative if it is already operative. A short pin has no effect on the locking bar since it does not cause the contact member 277 to engage the contact rod 280 but simply sets the solenoid 287 into buzzer circuit operation to turn the drum 260. Hence when the pins in a circumferential series of pins in the drum are alternately long and short pins they cause movement of the locking bar 137 from operative to inoperative position or vice versa upon the movement of each alternate tabular perforation between the contact members 100 and the contact plate 101. This in turn results in printing of the matter following the first tabular perforation, deleting the matter following the second and third tabular perforations, printing the matter following the fourth and fifth tabular perforations, etc. Thus in the example given the first and fourth columns of the indited tabular matter are printed while the second and third columns are deleted.

In the event that it is desired to print different tabular columns in different rows, for instance, in row I, columns 1 and 4, in row II, columns 2 and 3, in row III, columns 1, 2 and 3, and in row IV, columns 2, 3 and 4, a different arrangement of the long and short pins will accomplish this result.

Figure 28:
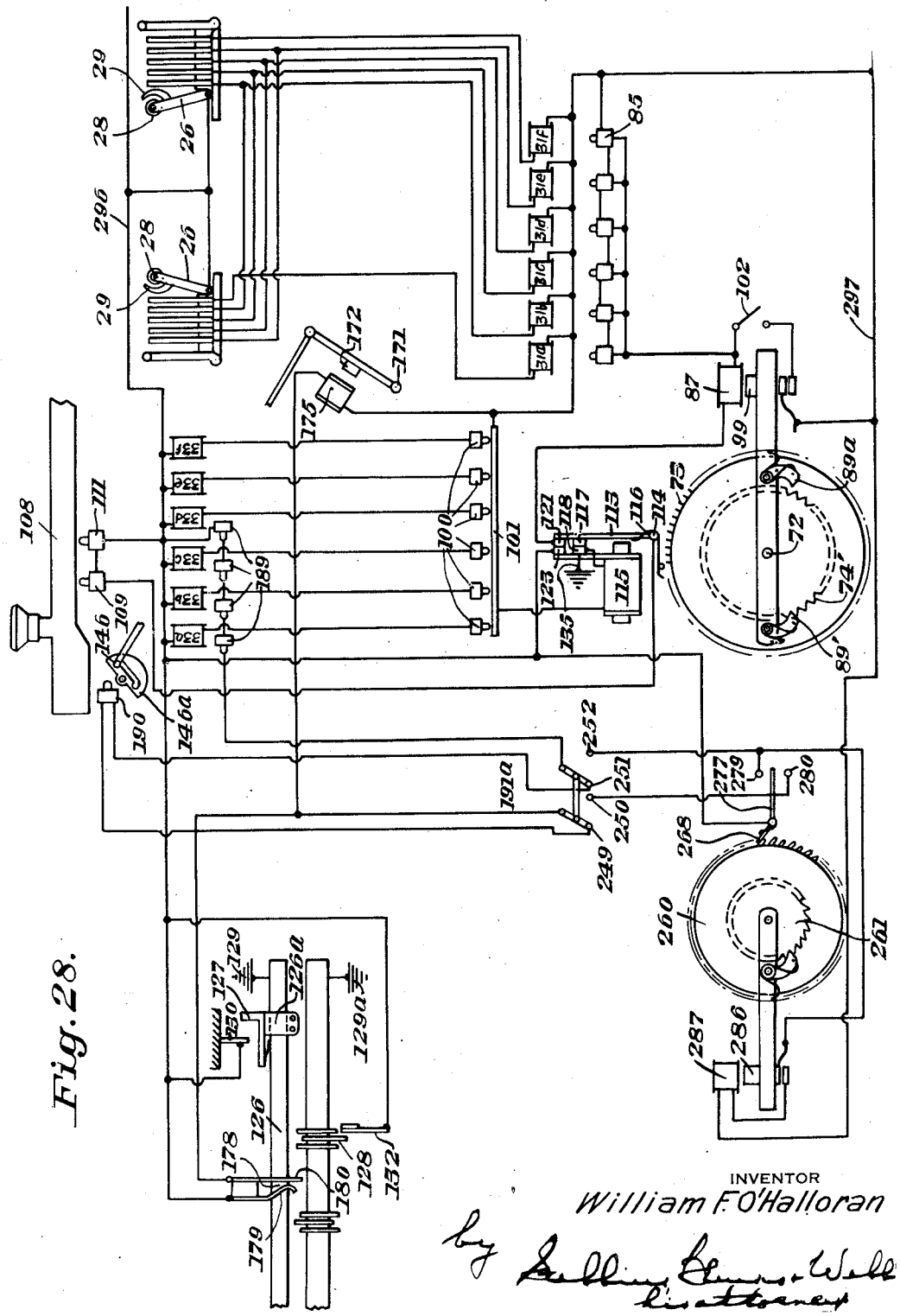
Figure 28 is a wiring diagram showing the interwiring of the various mechanisms of Figures 1 to 27, inclusive.

Figure 28 is a wiring diagram showing the interwiring of the various mechanisms of Figures 1 to 27, inclusive. The opposite sides of the current source are at 296 and 297. If the mechanism is wired as shown in Figure 28 and the leads 296 and 297 are connected with a source of electric current the machine will operate. Parts shown in Figure 28 are designated by the same reference numerals as are applied to those parts in other figures.

As an alternative to perforating a tape and successively forming different records using the tape as a control device, two or more typewriters may be electrically connected together for simultaneous operation to make different records by connecting the piles or fingers 24 to the solenoids 33a, 33b, 33c, 33d, 33e and 33f of successive typewriters.

Figures 29, 30 and 31 show another form of recording mechanism in which impulses made by operation of a master typewriter are transmitted to the operating mechanism of that typewriter and to other typewriters and means are provided which are operable from the keyboard of the master typewriter for selectively locking the operating mechanism of the typewriters so that selected portions of indited matter may be recorded by each thereof.

Referring first to Figure 29, there is provided a typewriter having the usual series of key levers 196, each provided with a key 197, the key levers being pivoted on a pivot rod 198. The opposite end of each of the key levers 196 is limited in its upward movement by a stop 199. Each key lever 196 is resiliently urged upwardly by a tension coil spring 200 biased between the lever and a stationary part 201 of the frame. The key levers are all electrically grounded to the frame as indicated at 202.

There is provided a roller 203 mounted upon an axle 204 whose axis is parallel to the axis of the pivot rod 198. The roller 203 extends continuously throughout the width of the typewriter and is of uniform diameter throughout. It is constantly power driven to turn in the direction of the arrow B when the typewriter is in use. There are provided two pivot rods 205, each having its axis parallel to the axis of the roller 203. On each of the rods 205 is provided a series of bell crank levers 206. The bell crank levers 206 of the respective series are arranged alternately axially of the rods 205. Each of the bell crank levers 206 has a generally horizontally extending arm 207 and a generally downwardly extending arm 208. Pivoted to each arm 208 at 209 is a cam 210. Each of the cams 210 is symmetrical, having two opposed surface portions which extend from a position relatively near the axis of the pivot 209 to a position relatively remote from the axis of the pivot 209. Each cam 210 has two diametrically opposite stop pins 211 adapted sequentially to cooperate with a stop 212 at the lower extremity of an arm 213 of a bell crank lever 214 pivoted at 215 to the corresponding bell crank lever 206. Each bell crank lever 214 has a laterally extending arm 216 for a purpose to be presently described.

Each of the bell crank levers 206 carries an arm 217 pivoted thereto at the pivot 215 above mentioned and extending generally downwardly from the pivot. A spring 218 biases the arm 217, urging the lower extremity of the arm toward the left, viewing Figure 29. Each cam 210 carries two pins 219 which are adapted for sequential or alternate cooperation with the arm 217. When each cam 210 is in position with one of the pins 211 engaged with the stop 212 of the corresponding arm 213 the arm 217 presses against one of the pins 219, tending to turn the cam in the clockwise direction, viewing Figure 29. When the arm 216 of any of the bell crank levers 214 is moved upwardly the stop 212 is removed from engagement with the pin 211 with which it has been in engagement and the arm 217 pushing against one of the pins 219 causes the corresponding cam 210 to commence rotation in the clockwise direction, viewing Figure 29.

After the cam 210 has rotated through a few degrees it engages the constantly power driven roller 203 since a portion of the cam of increasing diameter will be gradually approaching the roller. Power from the roller 203 is transmitted through the cam 210 and the bell crank lever 206 carrying the cam 210 is caused to turn about the axis of its pivot rod 205 so that its generally horizontally extending arm 207 moves downwardly or toward the roller 203. The cam 210 turns through approximately 180° when it is again arrested by engagement with the other of the two pins 211 with the stop 212, since the angular movement of the corresponding bell crank lever 214 is virtually instantaneous and that bell crank lever returns to its normal position with the stop 212 in the path of the pins 211 as soon as the operator has actuated the corresponding key 197. Spring means such as 218 or tension coil springs (not shown) connected with the respective arms 216 may, if desired, be employed for resiliently urging the respective bell crank levers 214 to turn in the direction to cause the respective arms 213 thereof to move inwardly or toward the roller 203. Means well known in the art may, if desired, be provided for insuring stopping of each cam 210 after it has rotated through 180° even though the operator continues to hold down the corresponding key 197. However, such means if provided forms no part of the present invention and hence is not shown.

One of the two pins 219 stops in engagement with the spring pressed arm 217 which is ready to start the cam turning in the clockwise direction, viewing Figure 29, the next time the stop 212 is drawn out of engagement with the corresponding pin 211.

A series of bell crank levers 220 is pivoted on the pivot rod 198 and disposed in alternate relationship with respect to the key levers 196. An adjustable link 221 is pivoted to each of the bell crank levers 220 at 222 and to a corresponding bell crank lever 206 by being pivoted at 223 to the extremity of the generally horizontally extending arm 207 thereof. Each bell crank lever 220 is biased by a tension coil spring 224 connected with it at 225 and with a rod 226 stationarily mounted in the frame so as to urge the bell crank lever 220 to turn in the counterclockwise direction about the axis of the pivot rod 198.

The typewriter comprises a carriage 227 slidable in ways 228 through the agency of ball bearings 229 and carrying a platen roller 230 having trunnions 231 through which it is rotatably mounted in the carriage 227. The platen roller 230 may be of well-known structure and is adapted to have the paper upon which a record is to be made in the typewriter disposed thereabout in relation to the types on the type bars so that when a type bar is moved to operative position its type will print on the paper disposed about the platen roller.

The typewriter contains the usual series of type bar levers 232 all pivoted on a rod 233 stationarily mounted in the frame and each carrying types 234. Pivoted to each type bar at 235 is a lever 236 which in turn is pivoted at 237 to a link 238 pivoted at 239 to one of the bell crank levers 220. Cooperating with each of the levers 236 is a link 298. Each link 298 is pivoted to the frame at 299 and to the corresponding lever 236 at 300. Each lever 236 has a projection 301 adapted when the parts are in the position shown in Figure 29, being maintained in that position by the spring 224, to engage a lug 302 on the link 298. Each cooperating lever 236 and link 298 form together a toggle.

When any of the bell crank levers 206 is turned about the corresponding pivot rod 205 in a direction such that its generally horizontal arm 207 moves downwardly, the corresponding link 221 turns the corresponding bell crank lever 220 in the clockwise direction about the axis of the pivot rod 198. That bell crank lever 220 through the rod 238 and the toggle 236—298 operates the type bar 232 to cause its type to print on the paper disposed about the platen roller 230. The disclosed typewriter carriage, platen roller, type bars and type bar operating mechanism are conventional.

Connected with the typewriter frame but electrically insulated therefrom is a series of spring arms 303, one disposed beneath each of the key levers 196 so that when that key lever is depressed by operation of the key 197 its lower surface will engage a contact 304 on the spring arm. The spring arm limits downward movement of the key lever, the spring arm being yieldable to some extent to avoid unnecessary shock. The typewriter has a stop rod 305 disposed stationarily therein but electrically insulated from the frame. Each spring arm 303 has a foot 306 extending beneath the stop rod 305 to limit upward movement of the spring arm.

The generally horizontally extending arm 216 of each of the bell crank levers 214 carries a core 307. Mounted in the typewriter frame above each of the cores 307 is a solenoid 308. In the example structure being described there will be considered to be three additional typewriters electrically connected with the master typewriter which is shown in Figure 29. The three additional typewriters may be the same as the master typewriter except that they do not need to have key levers like the key levers 196 of the master typewriter. Each of the three additional typewriters has a set of solenoids corresponding to the set of solenoids 308 of the master typewriter, one solenoid of each of the three additional typewriters being shown diagrammatically in Figure 29. These three solenoids are designated respectively 308a, 308b and 308c. It will be understood that the three solenoids 308a, 308b and 308c are for operating type bars in the three additional typewriters corresponding to the type bar operated by the solenoid 308 of the master typewriter. This is done by providing in each of the typewriters mechanism such as that shown in Figure 29 operated by the solenoids in the same manner as the mechanism of the master typewriter is operated by the solenoids 308. A lead 309 extends from each spring arm 303 to the corresponding solenoid 308. A lead 310 extends from that solenoid 308 to the corresponding solenoid 308a of the first of the three typewriters which are electrically connected in series with the typewriter shown in Figure 29. A lead 311 extends from that solenoid 308a to the corresponding solenoid 308b of the second of the three typewriters which are electrically connected in series with the typewriter shown in Figure 29. A lead 312 extends from that solenoid 308b to the corresponding solenoid 308c of the third of the three typewriters which are electrically connected in series with the typewriter shown in Figure 29. A lead 313 extends from each solenoid 308c to the source of current. A lead 314 extends from the source of current to the frame of the master typewriter where it is grounded at 315.

When one of the key levers 196 of the master typewriter is operated it engages the corresponding contact 304. This closes an electrical circuit through the lead 314 to the typewriter frame at 315 and from the typewriter frame at 202 through that key lever 196 and the corresponding spring arm 303, lead 309, solenoid 308, lead 310, solenoid 308a, lead 311, solenoid 308b, lead 312, solenoid 308c and the lead 313. This energizes the solenoids 308, 308a, 308b and 308c. Each of those solenoids tends to draw upwardly the corresponding arm 216 which as above explained carries a core 307 in the field of the solenoid. Unless the arms 216 of one or more of the four typewriters are restrained against upward movement in response to the corresponding solenoids the result will be drawing upwardly of an arm 216 of the master typewriter and the corresponding arms of the other three typewriters and printing the same character on all four typewriters.

Mechanism is provided for locking the arms 216 of any or any combination of the four typewriters at any time. Thus it is possible to delete selected indited matter on any typewriter and hence to print on each typewriter only particular indited matter selected for the record being made on that typewriter.

Each of the four typewriters has two locking rods 316 whose respective functions are analogous to the function of the locking bar 137 of the form of structure shown in Figures 1 to 28, inclusive. In each of the four typewriters of the structure now being described there are two opposed locking rods 316 each of which is adapted to cooperate with one of the two opposed series of arms 216. Each locking rod 316 has an operative position in engagement with the upper surfaces of the corresponding arms 216 adjacent the ends thereof as shown in Figure 29 and an inoperative position removed from the arms 216. The two locking rods 316 of each typewriter are as will presently appear operated synchronously so that both of them are at all times either in operative position or in inoperative position. When in any of the four typewriters the locking rods 316 are in operative position the arms 216 of that typewriter are by the locking rods held against operation. When the locking rods are thus held the energizing of the solenoids 308 or 308a or 308b or 308c, as the case may be, of that typewriter accomplishes no result. A solenoid tries to draw upwardly the corresponding arm 216, but the locking rod 316 does not permit the arm to move upwardly. Consequently, indited matter (i. e., matter represented by operations of the key levers 196 of the master typewriter) will be printed on those typewriters whose locking rods 316 are inoperative but will not be printed on those typewriters whose locking rods 316 are operative. Consequently, by arranging the locking rods 316 of the respective typewriters in operative or inoperative position the operator can determine whether any particular indited matter is or is not printed on any of the four records being made.

Means are provided on the keyboard of the master typewriter for selectively rendering operative and inoperative the locking rods 316 of all four of the typewriters. Pivoted on the pivot rod 198 of the master typewriter are four control key levers 317, one of which is shown in Figure 30. One of the control key levers 317 is for operating the locking rods 316 of the master typewriter, the second is for operating the locking rods 316 of the second typewriter, the third is for operating the locking rods 316 of the third typewriter and the fourth is for operating the locking rods 316 of the fourth typewriter. Since all four of the control key levers 317 operate in the same manner description of one will suffice for all.

Each of the control key levers 317 is like the key levers 196 limited in its upward movement by the stop 199 and is urged upwardly by a tension coil spring 318 biased between it and a stationary part 319. Each control key lever 317 is grounded to the frame as indicated at 320. Connected with the typewriter frame but electrically insulated therefrom are four spring arms 321, one disposed beneath each of the control key levers 317 so that when that control key lever is depressed by operation of the key 322 thereof its lower surface will engage a contact 323 on the spring arm. The spring arm limits downward movement of the control key lever, the spring arm being yieldable to some extent to avoid unnecessary shock. Each spring arm 321 has a foot 324 extending beneath the stop rod 305 to limit upward movement of the spring arm.

Pivoted to each of the pivot rods 205 of each typewriter is a lever 325. Each lever 325 has a downwardly extending arm 326 and a laterally outwardly and upwardly extending arm 327. Pivoted to each arm 326 at 328 is a cam 329 similar in all respects to the cams 210 and having opposed stop pins 330 corresponding to the stop pins 211 and pins 331 corresponding to the pins 219. The cams 329 are adapted to cooperate with the power-driven roller 203 in precisely the same way as are the cams 210. Mounted in the frame of each typewriter are opposed stops 332, one cooperating with each of the levers 325 to limit inward movement of its arm 326. A tension coil spring 333 is biased between the opposed arms 326 to resiliently urge them inwardly against the stops 332.

The stop pins 330 of each cam 329 are adapted sequentially to cooperate with a stop 334 at the lower extremity of an arm 335 of a bell crank lever 336 pivoted at 337 to the corresponding lever 325. Each bell crank lever 336 has a laterally extending arm 338 which is shorter than the arms 216 so that the corresponding locking rod 316 can never become operative to lock the arm 338. Each arm 338 has at its upper surface adjacent its outer end a core 339. Disposed above each core 339 is a solenoid 340.

When the control key lever 317 for any one of the four typewriters is depressed a circuit is closed from a source of current at 341 through the master typewriter frame at 342—320, that key lever 317, the corresponding spring arm 321, a lead 343 extending therefrom, one of the solenoids 340 of the typewriter to which the operated control key lever 317 corresponds, a lead 344, the other solenoid 340 of that typewriter and a lead 345 to the source of current. Thus operation of one of the four control key levers 317 causes, by reason of energization of the two solenoids 340 of the corresponding typewriter, upward movement of the corresponding arms 338 and operation of the corresponding cams 329 which causes turning of the corresponding levers 325 in a direction such that the arms 326 move outwardly or away from the roller 203.

Each of the four typewriters has journaled for rotation in the frame thereof opposed shafts 346, each having its axis parallel to the axis of the roller 203. Keyed to each shaft 346 are two T-levers 347 which are spaced apart axially of the shaft and may, if desired, be disposed at or near the ends thereof. Each such pair of T-levers 347 carries the corresponding locking rod 316. As will be seen by comparing Figures 30 and 31, swinging of the T-levers 347 so that their upper ends move inwardly brings the locking rods 316 into operative position to hold the arms 216 against upward movement while swinging of the T-levers 347 so that their upper ends move outwardly brings the locking rods 316 into inoperative position to permit upward movement of the arms 216. In Figure 30 the T-levers 347 are shown in the position in which the locking rods 316 carried thereby are operative. In Figure 31, which is a fragmentary view, the T-levers 347 on one side of one of the typewriters are shown in the position in which the locking rod 316 carried thereby is inoperative. When any pair of T-levers are in the position in which the locking rod 316 carried thereby is operative engagement of that locking rod with the upper surfaces of the arms 216 limits inward movement of the upper ends of the T-levers (Figure 30). When the T-levers are in the position in which the locking rod 316 carried thereby is inoperative outward movement of the upper ends of the T-levers is limited by a stop rod 348 (Figure 31).

Means are provided acting between each lever 325 and one of the T-levers 347 at the same side of the same typewriter whereby upon each angular operation of the lever 325 the corresponding T-levers 347 will be moved between the position in which the locking rod 316 carried thereby is operative and the position in which the locking rod 316 carried thereby is inoperative, i. e., upon each angular operation of the lever 325 the corresponding locking rod 316 will be moved to inoperative position if it is then in operative position or will be moved to operative position if it is then in inoperative position.

One of each pair of T-levers 347 has in its head a slot 349 which extends generally along the head of the lever but which has upwardly extending extremities 350. Disposed in the slot 349 is a pin 351 carried by the lower extremity of a lever 352 pivoted to the corresponding arm 327 at 353. An over center tension coil spring 354 is biased between the arm 327 at 355 and the lever 352 at 356. An over center tension coil spring 357 is biased between the T-lever 347 at 358 and the frame at 359.

When the parts are in the position shown in Figure 30 and the control key lever 317 is actuated to energize the solenoids 340 to release the cams 329 the respective levers 325 partake of angular movement with the upper extremities of the arms 327 moving generally upwardly and inwardly. Such movement of the upper extremity of each arm 327 causes the corresponding lever 352 to begin turning the corresponding T-lever 347 in the direction in which its upper extremity moves outwardly until the spring 357 moves over center, whereupon the T-lever snaps out into engagement with the stop rod 348. Of course the companion T-lever operates in the same way since each pair of T-levers are fixed to their shaft 346. Figure 31 shows the position of the parts with the cam 329 having its high point in engagement with the roller 203 and with the T-lever 347 snapped to its outer position by the spring 357. This causes the spring 354 to move over center and upon return of the lever 325 from the position of Figure 31 to the position of Figure 30 the pin 351 moves along the slot 349 to the outer extremity thereof. Upon the next operation of the control key lever 317 the lever 325 in similar manner causes movement of the T-lever 347 back to its inward position. Thus upon successive operations of each control key lever 317 the arms 216 of the corresponding typewriter are locked and unlocked.

If, for example, at the beginning of a particular passage of indited matter the arms 216 of the master typewriter only are locked by the locking rods 316 that matter will be printed on the second, third and fourth typewriters but not on the master typewriter. In similar manner the arms 216 of any, or any combination, of the typewriters may be locked at any time so that the operator can at all times predetermine at will whether any indited matter is printed or not printed on any of the four typewriters.

Controls similar to those above described may in similar manner be provided for carriage tabular and return movements so that the mechanism of Figures 29, 30 and 31 has all the adaptabilities of the mechanism of Figures 1 to 28, inclusive. The difference between the two mechanisms is that the mechanism of Figures 1 to 28, inclusive, provides a control device in the form of a perforated strip or tape which may be used as many times as desired to make as many records as desired, while the number of records which may be made at one time with the mechanism of Figures 29, 30 and 31 is limited by the number of typewriters employed.

While I have shown and described certain present preferred embodiments of the invention and have illustrated certain present preferred methods of practicing the same it is to be understood that the invention is not limited thereto but may be otherwise variously embodied and practiced within the scope of the following claims.

I claim:

1. In apparatus of the character described, an operating member, a mask connected with the operating member, a series of control members cooperable with the mask so that the mask is movable relatively to the control members only when the control members are respectively in positions predetermined in accordance with the shape of the mask and means operable to dispose the control members in said predetermined positions to permit movement of the mask relatively to the control members and hence operation of the operating member, the mask being shiftable transversely of the direction of its movement above referred to so that in different transverse positions it is movable in said direction relatively to the control members when the control members are differently positioned.

2. In apparatus of the character described, a series of operating members, a mask connected with each operating member, the masks being arranged in side by side relation, a series of control members cooperable with all of the masks so that each mask is movable relatively to the control members only when the control members are respectively in positions predetermined in accordance with the shape of that mask and means operable to successively dispose the control members in positions to permit movement of different masks relatively to the control members and hence operation of the operating members in desired sequence, at least certain of the masks being shiftable transversely of the direction of movement of the masks relatively to the control members so that in different transverse positions those particular masks are movable in said direction relatively to the control members when the control members are differently positioned.

3. In apparatus of the character described, an operating member, a mask connected with the operating member, a series of control members cooperable with the mask so that the mask is movable relatively to the control members only when the control members are respectively in positions predetermined in accordance with the shape of the mask, means operable to dispose the control members in said predetermined positions to permit movement of the mask relatively to the control members and hence operation of the operating member and means normally inoperative but movable into position to hold the operating member against movement relatively to the control members even when the control members are disposed in said predetermined positions.

4. In a typewriter, a series of printing mechanisms each for printing a character, means resiliently urging the printing mechanisms to operative position, a mask connected with each printing mechanism, the masks being arranged in side by side relation, a series of control members cooperable with all of the masks so that each mask is movable relatively to the control members only when the control members are respectively in positions predetermined in accordance with the shape of that mask, movement of a mask relatively to the control members permitting movement of the corresponding printing mechanism to operative position, means operable to successively dispose the control members in positions to permit successive movement of different masks relatively to the control members and hence successive movement of the respective corresponding printing mechanisms to operative position in response to said first mentioned means to print characters in desired sequence and means normally inoperative but movable into position to hold at least one of the printing mechanisms against movement to operative position even when the control members are disposed in positions to permit movement of the mask connected with that printing mechanism relatively to the control members.

5. In apparatus for recording characters, a series of recording mechanisms each operable to record a character, a mask connected with each recording mechanism, the masks being arranged in side by side relation, a unit comprising a series of control members which when the unit is in operative position are cooperable with all of the masks so that each mask is movable relatively to the control members only when the control members are respectively in positions predetermined in accordance with the shape of that mask, movement of a mask relatively to the control members permitting operation of the corresponding recording mechanism to record a character, means operable when the unit is in operative position to successively dispose the control members in positions to permit successive movement of different masks relatively to the control members and hence successive operation of the respective corresponding recording mechanisms to record characters in desired sequence and means for moving the unit to inoperative position to permit manual operation of the recording mechanisms.

6. In apparatus for recording characters, a series of recording mechanisms each operable to record a character, means normally resiliently urging the recording mechanisms to operative position, a mask connected with each recording mechanism, the masks being arranged in side by side relation, a unit comprising a series of control members which when the unit is in operative position are cooperable with all of the masks so that each mask is movable relatively to the control members only when the control members are respectively in positions predetermined in accordance with the shape of that mask, movement of a mask relatively to the control members permitting operation of the corresponding recording mechanism to record a character, means operable when the unit is in operative position to successively dispose the control members in positions to permit successive movement of different masks relatively to the control members and hence successive operation of the respective corresponding recording mechanisms to record characters in desired sequence in response to said first mentioned means and means for moving the unit to inoperative position and rendering said first mentioned means inoperative to permit manual operation of the recording mechanisms.

7. In apparatus for recording characters, a series of recording mechanisms each operable to record a character, means normally resiliently urging the recording mechanisms to operative position, a unit comprising control means operable when the unit is in operative position to cooperate with the recording mechanisms to permit or prevent operation of each thereof to record a character, means operable when the unit is in operative position to actuate the control means to permit successive operation of different recording mechanisms to record characters in desired sequence in response to said first mentioned means and means for moving the unit to inoperative position and rendering said first mentioned means inoperative to permit manual operation of the recording mechanisms.

8. In apparatus for recording characters, a series of recording mechanisms each operable to record a character, a first series of operating members, one for each recording mechanism and manually movable to cause operation of its associated recording mechanism, a second series of operating members, one for each recording mechanism, each member of said second series being movable between an inactive position and an active position wherein it tends to cause operation of its associated recording mechanism, a character selecting unit comprising a plurality of control members and movable between an inactive position and an active position wherein said control members cooperate with said recording mechanisms selectively to permit or prevent the operation of said mechanisms, means for actuating said control members to permit successive operation of different recording mechanisms in a desired sequence, and means for simultaneously shifting said selecting unit and said second series of operating members between their inactive and active positions.

9. Apparatus for printing characters, comprising a series of printing mechanisms each operable to print a character, blocking means movable between an inactive position and an active position in which it is effective to block operation of said printing mechanisms, a record strip having formed thereon groups of records of characters to be printed successively by said mechanisms, each said group of character records being preceded and followed on said strip by at least one of a number of distinctive control records less than the number of said groups, means for successively sensing the records on said strip, means including said sensing means for causing successive operation of the printing mechanisms corresponding to the successive character records on the strip when the mechanisms are not blocked by said blocking means, and selector means for rendering said blocking means responsive to certain of the control records on said strip, so that the groups of character records preceded and followed by said certain control records are sensed by said sensing means when the blocking means is in one of its two positions and the other groups of character records are sensed when the blocking means is in its other position.

10. Apparatus for printing characters, comprising a series of printing mechanisms each operable to print a character, blocking means movable between an inactive position and an active position in which it is effective to block operation of said printing mechanisms, a record strip having formed thereon groups of records of characters to be printed successively by said mechanisms, each said group of character records being preceded and followed on said strip by at least one of a number of distinctive control records, said number of distinctive control records being less than the number of groups so that certain of said distinctive control records appear adjacent a plurality of said groups, means for successively sensing the records on said strip, means including said sensing means for causing successive operation of the printing mechanisms corresponding to the successive character records on the strip when the mechanisms are not blocked by said blocking means, and selector means for rendering said blocking means responsive to the sensing of said certain control records, so that said plurality of groups of records are sensed by said sensing means when the blocking means is in one of its two positions and the other groups of character records are sensed when the blocking means is in its other position.

11. Apparatus for printing characters, comprising a series of printing mechanisms each operable to print a character, blocking means movable between an inactive position and an active position in which it is effective to block operation of said printing mechanisms, a record strip having formed thereon groups of records of characters to be printed successively by said mechanisms, each said group of character records being preceded and followed on said strip by at least one of a number of distinctive control records less than the number of said groups, means for successively sensing the records on said strip, means including said sensing means for causing successive operation of the printing mechanisms corresponding to the successive character records on the strip when the mechanisms are not blocked by said blocking means, means for operating said blocking means between its inactive and active positions, and selector means for rendering said operating means responsive to certain of the control records on said strip, so that each of said certain control records causes a reversal of the position of the blocking means, whereby the groups of character records preceded and followed by said certain control records are sensed by said sensing means when the blocking means is in one of its two positions and the other groups of character records are sensed when the blocking means is in its other position.

12. A typewriter comprising a set of manually movable key levers, a set of type bars each operable to print a character, a set of mechanisms, each mechanism connecting a key lever to a type bar for operation thereof, a record strip having formed thereon groups of records of characters to be printed successively by said type bars, each said group of character records being preceded and followed by control records, means for successively sensing the records on said strip, means including the sensing means for successively operating the key levers and type bars in accordance with the successive character records on the strip, a blocking bar movable between an inactive position and an active position in which it blocks the key levers and prevents printing of the characters, and means responsive to certain of said control records for moving the blocking bar between its two positions so that the groups of character records preceded and followed by said certain control records are sensed by said sensing means when the blocking bar is in one of its two positions and the other groups of character records are sensed when the blocking bar is in its other position.

13. A typewriter comprising a set of manually movable key levers, a set of type bars each operable to print a character, a set of mechanisms, each mechanism connecting a key lever to a type bar for operation thereof, a record strip having formed thereon groups of records of characters to be printed successively by said type bars, each said group of character records being preceded and followed by control records, means for successively sensing the records on said strip, means including the sensing means for successively operating the key levers and type bars in accordance with the successive character records on the strip, a blocking bar movable between an inactive position and an active position in which it blocks the key levers and prevents printing of the characters, at least one selector lever adjacent said key levers and operated by said operating means when certain of said control records are sensed by the sensing means, and means connecting the selector lever to the blocking bar for operating it between its two positions, said selector lever having a slot aligned with the bar so that it is not blocked by the bar.

14. A typewriter comprising a set of manually movable key levers, a set of type bars each operable to print a character, a set of mechanisms, each mechanism connecting a key lever to a type bar for operation thereof, a record strip having formed thereon groups of records of characters to be printed successively by said type bars, each said group of character records being preceded and followed by control records, means for successively sensing the records on said strip, means including the sensing means for successively operating the key levers and type bars in accordance with the successive character records on the strip, a blocking bar movable between an inactive position and an active position in which it blocks the key levers and prevents printing of the characters, at least one selector lever operated by said operating means, means connecting the selector lever to the blocking bar for operating it between its two positions, and means for selectively rendering said selector lever responsive to different control records on said strip so as to select different groups of characters on said strip to be printed by said type bars.

15. A typewriter comprising a set of manually movable key levers, a set of type bars each operable to print a character, a set of mechanisms, each mechanism connecting a key lever to a type bar for operation thereof, a record strip having formed thereon groups of records of characters to be printed successively by said type bars, each said group of character records being preceded and followed by control records, means for successively sensing the records on said strip, means including the sensing means for successively operating the key levers and type bars in accordance with the successive character records on the strip, a blocking bar movable between an inactive position and an active position in which it blocks the key levers and prevents printing of the characters, at least one selector lever operated by said operating means when certain of said control records are sensed by said sensing means, and means connecting said selector lever to said blocking bar and effective upon one operation of the selector lever to move the bar to one of its two positions and upon the next succeeding operation of the selector lever to move the bar to its other position.

16. A typewriter comprising a set of manually movable key levers, a set of type bars each operable to print a character, a set of mechanisms, each mechanism connecting a key lever to a type bar for operation thereof, a record strip having formed thereon groups of records of characters to be printed successively by said type bars, each said group of character records being preceded and followed by control records, means for successively sensing the records on said strip, means including the sensing means for successively operating the key levers and type bars in accordance with the successive character records on the strip, a blocking bar movable between an inactive position and an active position in which it blocks the key levers and prevents printing of the characters, two selector levers operated by said operating means and respectively responsive to different control records on said strip, and means connecting both said selector levers to the blocking bar so that operation of either selector lever causes operation of the blocking bar between its two positions.

17. A typewriter comprising a set of manually movable key levers, a set of type bars each operable to print a character, a set of mechanisms, each mechanism connecting a key lever to a type bar for operation thereof, a record strip having formed thereon groups of records of characters to be printed successively by said type bars, each said group of character records being preceded and followed by control records, means for successively sensing the records on said strip, means including the sensing means for successively operating the key levers and type bars in accordance with the successive character records on the strip, a blocking bar movable between an inactive position and an active position in which it blocks the key levers and prevents printing of the characters, two selector levers operated by said operating means and respectively responsive to different control records on said strip, and means connecting both said selector levers to the blocking bar, said connecting means being effective upon an operation of either selector lever to move the bar to one of its two positions and upon the next succeeding operation of either selector lever to move the bar to its other position.

18. Apparatus for printing characters, comprising a shiftable carriage, by which a sheet may be supported for the printing of characters thereon, a series of printing mechanisms each operable to print a character, means for actuating said printing mechanisms in a predetermined sequence to print said characters in a corresponding sequence, blocking means movable between an inactive position and an active position in which it is effective to block operation of said printing mechanisms, means for shifting said carriage, means responsive to the position of the carriage for operating the blocking means, at least one tabulator key, and means responsive to actuation of the tabulator key for releasing said blocking means.

19. Apparatus for printing characters, comprising a shiftable carriage, by which a sheet may be supported for the printing of characters thereon, a series of printing mechanisms each operable to print a character, means for actuating said printing mechanisms in a predetermined sequence to print said characters in a corresponding sequence, blocking means movable between an inactive position and an active position in which it is effective to block operation of said printing mechanisms, means for operating the blocking means, at least one tabulator key, and means responsive to actuation of the tabulator key for releasing the blocking means.

20. Apparatus for printing characters, comprising a shiftable carriage, by which a sheet may be supported for the printing of characters thereon, a series of printing mechanisms each operable to print a character, means for actuating said printing mechanisms in a predetermined sequence to print said characters in a corresponding sequence, blocking means movable between an inactive position and an active position in which it is effective to block operation of said printing mechanisms, at least one tabulator key for controlling carriage movements, first means for operating said blocking means in response to the position of the tabulator key, second means for operating said blocking means at arbitrarily selected points in said sequence, and means for selectively placing said blocking means under control of said first or said second operating means.

WILLIAM F. O'HALLORAN.

REFERENCES CITED

The following references are of record in the file of this patent:

UNITED STATES PATENTS

| Number | Name | Date |
|---|---|---|
| 871,026 | Brewer | Nov. 12, 1907 |
| 1,066,224 | Roberts | July 1, 1913 |
| 1,239,466 | Dennis | Sept. 11, 1917 |
| 1,426,803 | Adams | Aug. 22, 1922 |
| 1,519,054 | Reynolds | Dec. 9, 1924 |
| 1,800,596 | Bryce | Apr. 14, 1931 |
| 1,996,013 | Thompson | Mar. 26, 1935 |
| 2,019,442 | Buehler | Oct. 29, 1935 |
| 2,199,541 | Harrison et al. | May 7, 1940 |
| 2,217,150 | Ayres | Oct. 8, 1940 |
| 2,247,275 | Buckley | June 24, 1941 |
| 2,255,030 | Tholstrup | Sept. 2, 1941 |
| 2,320,637 | Modigliani | June 1, 1943 |
| 2,346,267 | Mills et al. | Apr. 11, 1944 |
| 2,346,819 | Buckley | Apr. 18, 1944 |
| 2,379,862 | Bush | July 10, 1945 |
| 2,377,801 | Mills et al. | June 5, 1945 |
| 2,378,371 | Tholstrup | June 12, 1945 |
| 2,390,413 | Ayres | Dec. 4, 1945 |